US012672143B2

(12) United States Patent  
Matsumura et al.

(10) Patent No.: US 12,672,143 B2  
(45) Date of Patent: Jun. 30, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 453 days.

(21) Appl. No.: 18/265,044

(22) PCT Filed: Dec. 3, 2020

(86) PCT No.: PCT/JP2020/045086  
§ 371 (c)(1),  
(2) Date: Jun. 2, 2023

(87) PCT Pub. No.: WO2022/118437  
PCT Pub. Date: Jun. 9, 2022

(65) Prior Publication Data  
US 2024/0015753 A1 Jan. 11, 2024

(51) Int. Cl.  
*H04W 72/21* (2023.01)  
*H04L 5/00* (2006.01)

(52) U.S. Cl.  
CPC ........... *H04W 72/21* (2023.01); *H04L 5/0053* (2013.01); *H04L 5/0096* (2013.01)

(58) Field of Classification Search  
CPC ..... H04W 72/21; H04L 5/0053; H04L 5/0096  
USPC ....................................................... 370/329  
See application file for complete search history.

(56) References Cited

U.S. PATENT DOCUMENTS

2011/0243083 A1* 10/2011 Zhang ..................... H04W 8/22  
370/328  
2023/0156626 A1* 5/2023 Ling ................... H04W 52/325  
455/522

FOREIGN PATENT DOCUMENTS

WO 2020/230839 A1 11/2020

OTHER PUBLICATIONS

Office Action issued in Japanese Patent Application No. 2022-566583, mailed on Feb. 4, 2025 (6 pages).  
Lenovo, Motorola Mobility; "Enhancements on Multi-TRP for PDCCH, PUCCH and PUSCH"; 3GPP TSG RAN WG1 #103-e, R1-2008911; e-Meeting; Oct. 26-Nov. 13, 2020 (17 pages).

(Continued)

*Primary Examiner* — Chi Tang P Cheng  
(74) *Attorney, Agent, or Firm* — Osha Bergman Watanabe & Burton LLP

(57) ABSTRACT

A terminal according to one aspect of the present disclosure includes: a control section that determines two values of a power control parameter when physical uplink control channel (PUCCH) spatial relation information is not provided; and a transmitting section that transmits a PUCCH by using at least one of the two values of the power control parameter and one or more transmission occasions. The two values are associated with two respective indices. The two indices are either two index values of a control resource set (CORE-SET) pool index or two index values of a transmission configuration indication (TCI) state associated with one codepoint of a field in downlink control information. According to one aspect of the present disclosure, a power control parameter can be appropriately determined.

7 Claims, 13 Drawing Sheets

(56) References Cited

OTHER PUBLICATIONS

Moderator (Nokia, Nokia Shanghai Bell); "Summary of Multi-TRP URLLC for PUCCH and PUSCH"; 3GPP TSG RAN WG1 #103, R1-2009480; e-Meeting; Oct. 26-Nov. 13, 2020 (16 pages).

Nokia, Nokia Shanghai Bell; "Enhancements for Multi-TRP URLLC schemes"; 3GPP TSG RAN WG1 #103 Meeting, R1-2008904; e-Meeting; Oct. 26-Nov. 13, 2020 (17 pages).

International Search Report issued in PCT/JP2020/045086 on Jul. 20, 2021 (2 pages).

Written Opinion of the International Searching Authority issued in PCT/JP2020/045086 on Jul. 20, 2021 (3 pages).

Samsung; "Enhancements on Multi-TRP/Panel Transmission"; 3GPP TSG RAN WG1 Meeting #99, R1-1912482; Reno, USA; Nov. 18-22, 2019 (13 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Office Action issued in Chinese Patent Application No. 202080108384.2, dated Jan. 29, 2026 (20 pages).

* cited by examiner

FIG. 1C
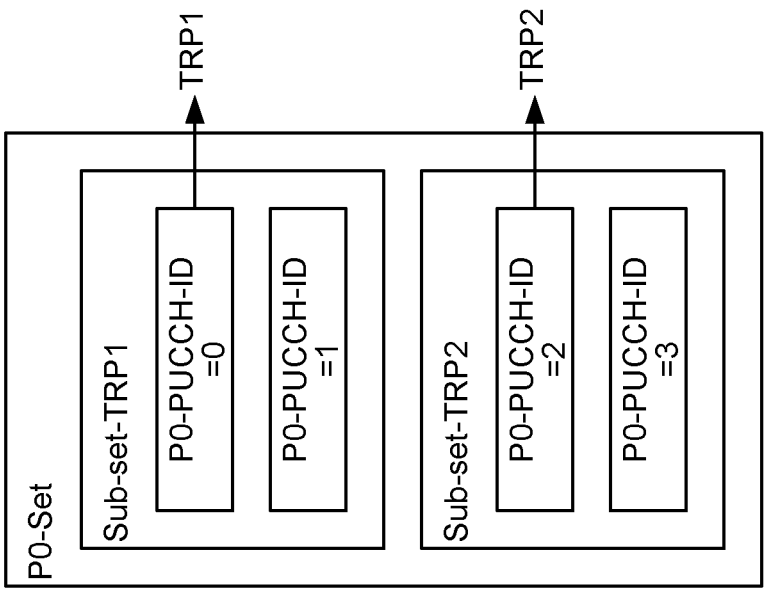
FIG. 1B
FIG. 1A
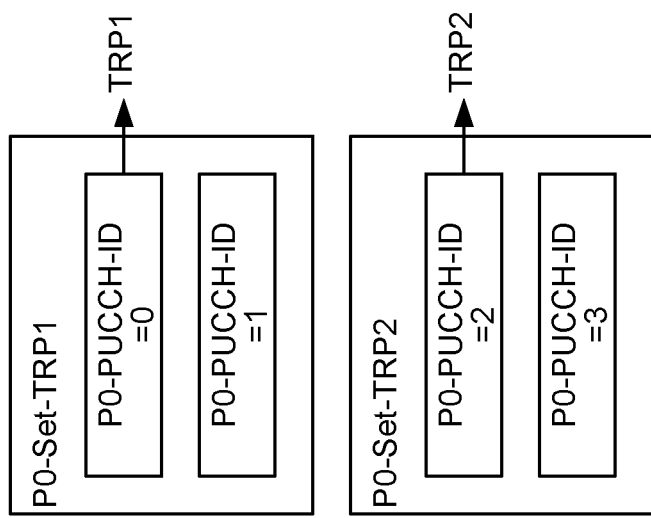

MAPPING 1   TRP1   TRP2   TRP1   TRP2

PUCCH repetition   #1   #2   #3   #4

MAPPING 2   TRP1   TRP1   TRP2   TRP2   TRP1   TRP1   TRP2   TRP2

PUCCH repetition   #1   #2   #3   #4   #5   #6   #7   #8

MAPPING 3   TRP1   TRP1   TRP1   TRP1   TRP2   TRP2   TRP2   TRP2

PUCCH repetition   #1   #2   #3   #4   #5   #6   #7   #8

FIG. 7C
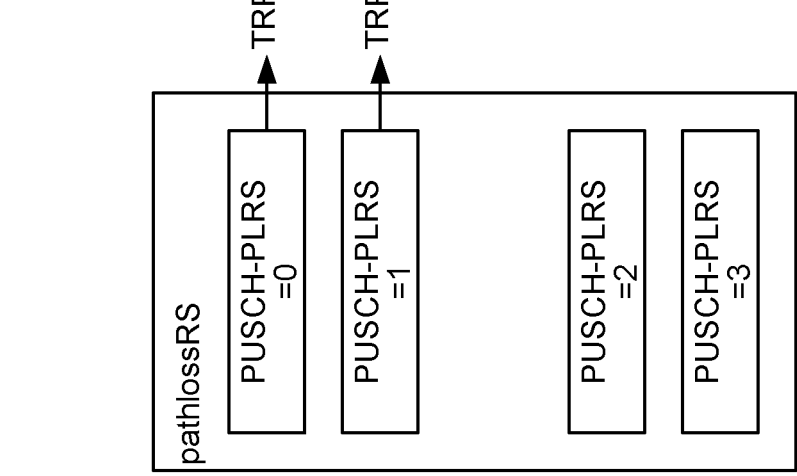
FIG. 7B
FIG. 7A
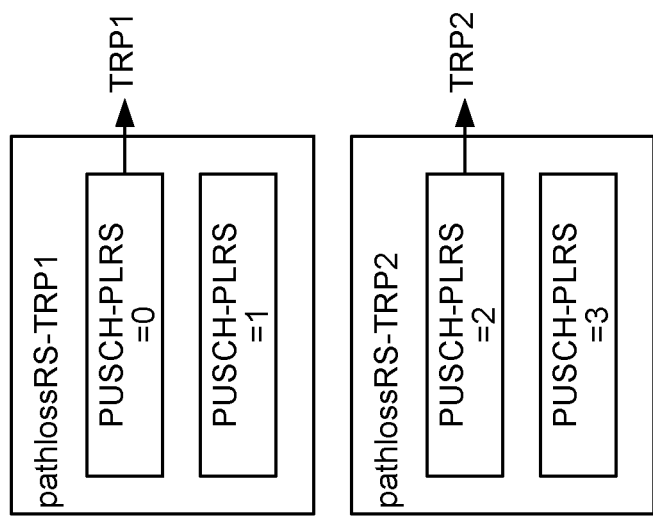

FIG. 9A
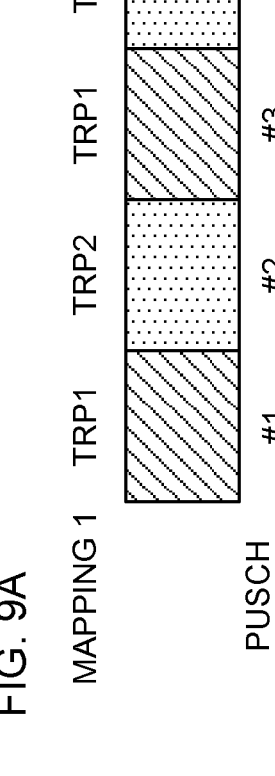
MAPPING 1     TRP1     TRP2     TRP1     TRP2
PUSCH repetition     #1     #2     #3     #4
FIG. 9B
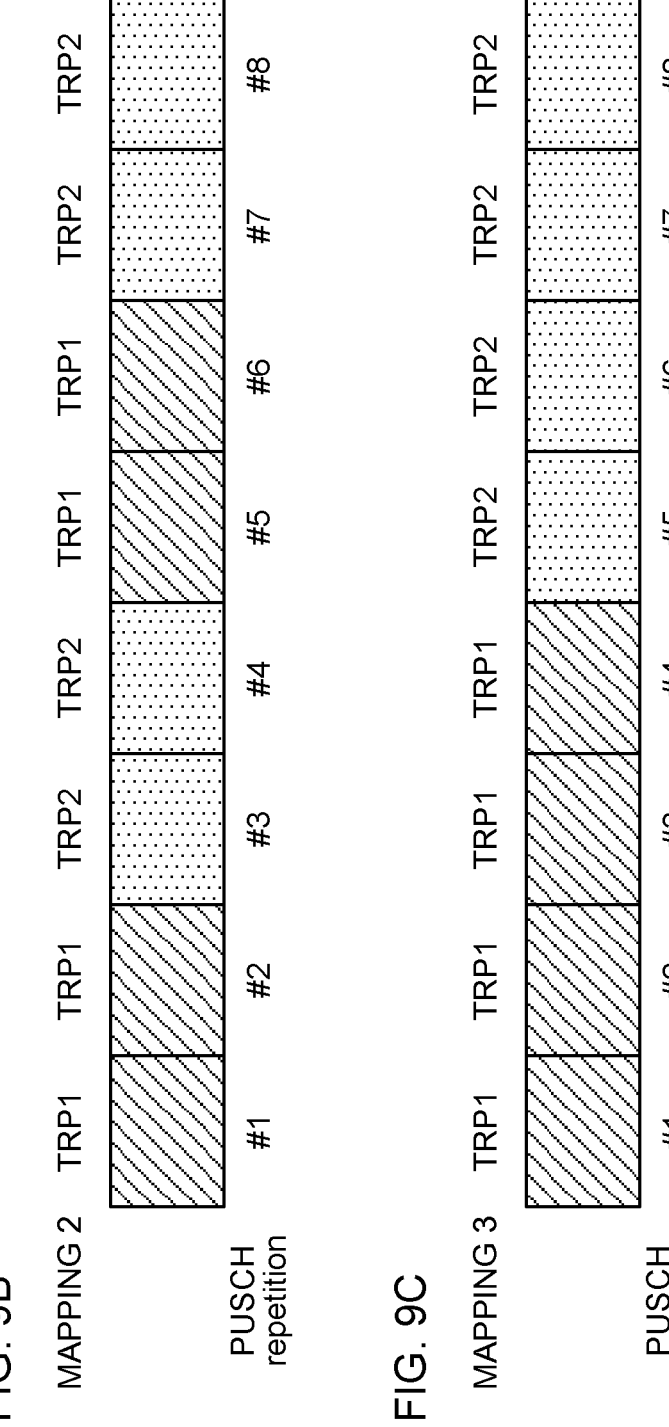
MAPPING 2     TRP1     TRP1     TRP2     TRP2     TRP1     TRP1     TRP2     TRP2
PUSCH repetition     #1     #2     #3     #4     #5     #6     #7     #8
FIG. 9C
MAPPING 3     TRP1     TRP1     TRP1     TRP1     TRP1     TRP2     TRP2     TRP2
PUSCH repetition     #1     #2     #3     #4     #5     #6     #7     #8

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), it is studied that a user terminal (terminal, User Equipment (UE)) controls transmission processing of uplink (UL) transmission (UL channel/UL signal), based on information related to quasi-co-location (QCL) (QCL assumption/Transmission Configuration Indication (TCI) state/spatial relation) and a power control parameter.

However, there are cases where a method of determining a power control parameter is not definite. Unless the power control parameter is definite, degradation in communication quality, throughput reduction, and the like may occur.

Thus, an object of the present disclosure is to provide a terminal, a radio communication method, and a base station that can appropriately determine a power control parameter.

Solution to Problem

A terminal according to one aspect of the present disclosure includes: a control section that determines two values of a power control parameter when physical uplink control channel (PUCCH) spatial relation information is not provided; and a transmitting section that transmits a PUCCH by using at least one of the two values of the power control parameter and one or more transmission occasions, wherein the two values are associated with two respective indices, and the two indices are either two index values of a control resource set (CORESET) pool index or two index values of a transmission configuration indication (TCI) state associated with one codepoint of a field in downlink control information.

Advantageous Effects of Invention

According to one aspect of the present disclosure, a power control parameter can be appropriate.

BRIEF DESCRIPTION OF DRAWINGS

FIGS. 1A to 1C are diagrams to show examples of a configuration of P0s for PUCCH according to aspect 1-1.

FIGS. 6A to 6C are diagrams to show examples of a configuration of P0 for PUSCH according to aspect 4-2.

FIGS. 7A to 7C are diagrams to show examples of a configuration of PLRS for PUSCH according to aspect 4-3.

FIGS. 9A to 9C are diagrams to show examples of a mapping pattern according to aspect 5-2.

Figures 2A, 2B, 2C:
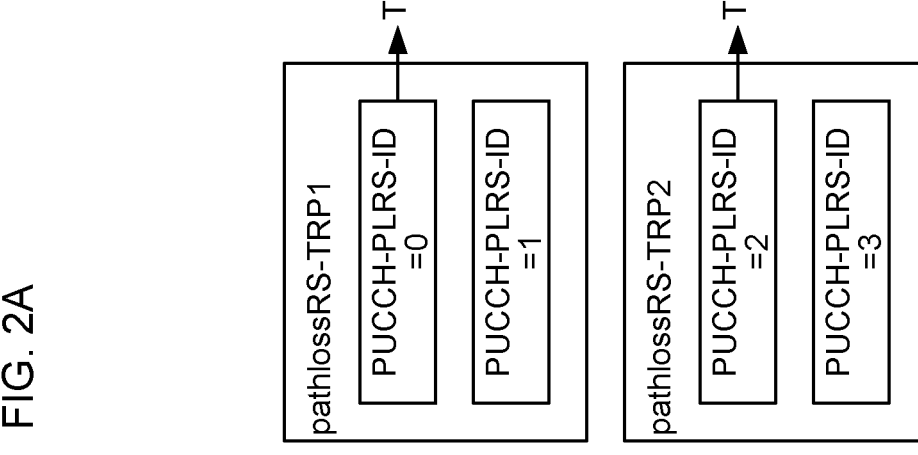
FIGS. 2A to 2C are diagrams to show examples of a configuration of PLRSs for PUCCH according to aspect 1-2.

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) of at least one of a signal and a channel (referred to as a signal/channel) in a UE, based on a transmission configuration indication state (TCI state) is under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, and delay spread QCL type B (QCL-B): Doppler shift and Doppler spread QCL type C (QCL-C): Doppler shift and average delay QCL type D (QCL-D): Spatial reception parameter A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

The physical layer signaling may be, for example, downlink control information (DCI).

A channel for which the TCI state or spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An RS of QCL type X in a TCI state may mean an RS in a relationship of QCL type X with (a DMRS of) a certain channel/signal, and this RS may be referred to as a QCL source of QCL type X in the TCI state.

For a PDCCH and a PDSCH, a QCL type A RS is configured necessarily while a QCL type D RS may be configured optionally. Since it is difficult to estimate Doppler shift, delay, and the like, based on one-shot reception of a DMRS, a QCL type A RS is used for improvement of channel estimation accuracy. A QCL type D RS is used for reception beam determination at the time of DMRS reception.

For example, TRSs 1-1, 1-2, 1-3, and 1-4 are transmitted, and TRS 1-1 is notified as a QCL type C/D RS, based on the TCI state of a PDSCH. When the UE is notified of the TCI state, the UE can use information obtained as a result of past periodic reception/measurement of TRS 1-1, for reception/channel estimation of a DMRS for a PDSCH. In this case, the QCL source of the PDSCH is TRS 1-1, and a QCL target is the DMRS for the PDSCH.

(Multi-TRP)

For NR, it is studied that one or a plurality of transmission/reception points (TRPs) (multi-TRP (multi TRP (MTRP))) perform DL transmission to a UE by using one or a plurality of panels (multi-panel). It is also studied that the UE performs UL transmission to the one or plurality of TRPs by using one or a plurality of panels.

Note that the plurality of TRPs may correspond to the same cell identifier (ID) or may correspond to different cell IDs. The cell ID may be a physical cell ID or a virtual cell ID.

The multi-TRP (for example, TRPs #1 and #2) may be connected via ideal/non-ideal backhaul to exchange information, data, and the like. Each TRP of the multi-TRP may transmit a different codeword (Code Word (CW)) and a different layer. As one mode of multi-TRP transmission, non-coherent joint transmission (NCJT) may be employed.

In NCJT, for example, TRP #1 performs modulation mapping on a first codeword, performs layer mapping, and transmits a first PDSCH in layers of a first number (for example, two layers) by using first precoding. TRP #2 performs modulation mapping on a second codeword, performs layer mapping, and transmits a second PDSCH in layers of a second number (for example, two layers) by using second precoding.

Note that a plurality of PDSCHs (multi-PDSCH) transmitted by NCJT may be defined to partially or entirely overlap in terms of at least one of the time and frequency domains. In other words, the first PDSCH from a first TRP and the second PDSCH from a second TRP may overlap in terms of at least one of the time and frequency resources.

The first PDSCH and the second PDSCH may be assumed not to be in a quasi-co-location (QCL) relationship (not to be quasi-co-located). Reception of the multi-PDSCH may be interpreted as simultaneous reception of PDSCHs of a QCL type other than a certain QCL type (for example, QCL type D).

A plurality of PDSCHs (which may be referred to as multi-PDSCH (multiple PDSCHs)) from the multi-TRP may be scheduled by using one piece of DCI (single DCI, single PDCCH) (single master mode, multi-TRP based on single DCI (single-DCI based multi-TRP)). The plurality of PDSCHs from the multi-TRP may be separately scheduled by using a plurality of pieces of DCI (multi-DCI, multi-PDCCH (multiple PDCCHs)) (multi-master mode, multi-TRP based on multi-DCI (multi-DCI based multi-TRP)).

For URLLC for multi-TRP, it is studied to support PDSCH (transport block (TB) or codeword (CW)) repetition over multi-TRP. It is studied to support a scheme of repetition over multi-TRP in the frequency domain, the layer (space) domain, or the time domain (URLLC schemes, for example, schemes 1, 2a, 2b, 3, 4). In scheme 1, multi-PDSCH from multi-TRP is space division multiplexed (SDMed). In schemes 2a and 2b, PDSCHs from multi-TRP are frequency division multiplexed (FDMed). In scheme 2a, a redundancy version (RV) is the same for the multi-TRP. In scheme 2b, an RV may be the same or may be different for the multi-TRP. In schemes 3 and 4, multi-PDSCH from multi-TRP is time division multiplexed (TDMed). In scheme 3, multi-PDSCH from multi-TRP is transmitted in one slot. In scheme 4, multi-PDSCH from multi-TRP is transmitted in different slots.

According to such a multi-TRP scenario, more flexible transmission control using a channel with high quality is possible.

To support intra-cell (with the same cell ID) and inter-cell (with different cell IDs) multi-TRP transmission based on a plurality of PDCCHs, one control resource set (CORESET) in PDCCH configuration information (PDCCH-Config) may correspond to one TRP in RRC configuration information for linking a plurality of pairs of a PDCCH and a PDSCH with a plurality of TRPs.

When at least one of conditions 1 and 2 below is satisfied, the UE may determine that it is multi-TRP based on multi-DCI. In this case, a TRP may be interpreted as a CORESET pol index.

{Condition 1}

One CORESET pool index is configured.

{Condition 2}

Two different values (for example 0 and 1) of a CORE-SET pool index are configured.

When the following condition is satisfied, the UE may determine that it is multi-TRP based on single DCI. In this case, two TRPs may be interpreted as two TCI states indicated by a MAC CE/DCI.

{Condition}

To indicate one or two TCI states for one codepoint of a TCI field in DCI, an "enhanced TCI states activation/deactivation for UE-specific PDSCH MAC CE" is used.

DCI for common beam indication may be a UE-specific DCI format (for example, DL DCI format (for example, 1_1, 1_2)), may be a UL DCI format (for example, 0_1, 0_2), or may be a UE-group common DCI format.

(Pathloss RS)

A pathloss $PL_{b,f,c}(q_d)$ [dB] in transmission power control of each of a PUSCH, a PUCCH, and an SRS is calculated by the UE by using an index $q_d$ of a reference signal (RS, pathloss reference RS (PathlossReferenceRS)) for downlink BWP associated with an active UL BWP b in a carrier f of a serving cell c. In the present disclosure, a pathloss reference RS, a pathloss (PL)-RS, a PLRS, an index $q_d$, an RS used for pathloss calculation, and an RS resource used for pathloss calculation may be interchangeably interpreted. In the present disclosure, calculation, estimation, measurement, and track may be interchangeably interpreted.

It is studied that, when the pathloss RS is updated by a MAC CE, whether to change an existing mechanism of a higher layer filtered RSRP for pathloss measurement.

When the pathloss RS is updated by a MAC CE, pathloss measurement based on an L1-RSRP may be employed. At available timing after the MAC CE for updating the pathloss RS, the higher layer filtered RSRP may be used for pathloss measurement while an L1-RSRP may be used for pathloss measurement before the higher layer filtered RSRP is used. At available timing after the MAC CE for updating the pathloss RS, the higher layer filtered RSRP is used for pathloss measurement while a higher layered filtered RSRP of the previous pathloss RS may be used before the timing. Similarly to Rel-15 operation, a higher layer filtered RSRP may be used for pathloss measurement, and the UE may track all the pathloss RS candidates configured by RRC. The maximum number of pathloss RSs configurable by RRC may depend on UE capability. When the maximum number of pathloss RSs configurable by RRC is X, X or less pathloss RS candidates may be configured by RRC, and a pathloss RS may be selected by a MAC CE from among the config-ured pathloss RS candidates. The maximum number of pathloss RSs configurable by RRC may be 4, 8, 16, 64, and the like.

In the present disclosure, a higher layer filtered RSRP, a filtered RSRP, and a layer 3 filtered RSRP may be inter-changeably interpreted.

(Default TCI State/Default Spatial Relation/Default PL-RS)

In an RRC connected mode, in both a case where infor-mation of TCI in DCI (higher layer parameter TCI-Pre-sentInDCI) is set as "enabled" and a case where the infor-mation of TCI in DCI is not configured, when a time offset between reception of DL DCI (DCI for scheduling a PDSCH) and the corresponding PDSCH (PDSCH scheduled by the DCI) is less than a threshold (timeDurationForQCL) (application condition, first condition), the TCI state (default TCI state) of a PDSCH may be the TCI state corresponding to the lowest CORESET ID in the latest slot in an active DL BWP in the CC (of a particular UL signal) if non-cross carrier scheduling is performed. Otherwise, the TCI state (default TCI state) of the PDSCH may be the TCI state of the lowest TCI state ID of the PDSCHs in the active DL BWP in a scheduled CC.

In Rel. 15, separate MAC CEs, specifically, a MAC CE for activation/deactivation of a PUCCH spatial relation and a MAC CE for activation/deactivation of an SRS spatial relation, are needed. The PUSCH spatial relation follows the SRS spatial relation.

In Rel. 16, at least one of a MAC CE for activation/deactivation of a PUCCH spatial relation and a MAC CE for activation/deactivation of an SRS spatial relation need not necessarily be used.

If neither a spatial relation nor a PL-RS for a PUCCH is configured in FR2 (application condition, second condition), default assumptions of a spatial relation and a PL-RS (default spatial relation and default PL-RS) are used for the PUCCH. If neither a spatial relation nor a PL-RS for an SRS (SRS resource for the SRS or SRS resource corresponding to an SRI in DCI format 0_1 for scheduling a PUSCH) is configured in FR2 (application condition, second condition), the default assumptions of a spatial relation and a PL-RS (default spatial relation and default PL-RS) are used for the PUSCH scheduled by DCI format 0_1 and the SRS.

If a CORESET is configured in the active DL BWP in the CC (application condition), the default spatial relation and the default PL-RS may be the TCI state or the QCL assumption of the CORESET having the lowest CORESET ID in the active DL BWP. If no CORESET is configured in the active DL BWP in the CC, the default spatial relation and the default PL-RS may be the active TCI state having the lowest ID of the PDSCHs in the active DL BWP.

In Rel. 15, the spatial relation of a PUSCH scheduled in DCI format 0_0 follows the spatial relation of the PUCCH resource having the lowest PUCCH resource ID among active spatial relations of the PUCCHs in the same CC. Even when no PUCCH is transmitted in an SCell, a network need update all the PUCCH spatial relations in the SCell.

In Rel. 16, no PUCCH configuration for a PUSCH scheduled by DCI format 0_0 is needed. When no active PUCCH spatial relation is present or no PUCCH resource is present for a PUSCH scheduled by DCI format 0_0 in the active UL BWP in the CC (application condition, second condition), the default spatial relation and the default PL-RS are used for the PUSCH.

An application condition of a default spatial relation/default PL-RS for SRS may include an enable default beam pathloss for SRS information element (higher layer parameter enableDefaultBeamPlForSRS) is set as enabled. An application condition of a default spatial relation/default PL-RS for PUCCH may include an enable default beam pathloss for PUCCH information element (higher layer parameter enableDefaultBeamPlForPUCCH) is set as enabled. An application condition of a default spatial relation/default PL-RS for PUSCH scheduled by DCI format 0_0 may include an enable default beam pathloss for PUSCH scheduled by DCI format 0_0 information element (higher layer parameter enableDefaultBeamPlFor-PUSCH0_0) is set as enabled.

The threshold may be referred to as time duration for QCL, "timeDurationForQCL," "Threshold," "Threshold for offset between a DCI indicating a TCI state and a PDSCH scheduled by the DCI," "Threshold-Sched-Offset," a schedule offset threshold, a scheduling offset threshold, and the like.

(PUCCH Power Control)

In NR, the transmission power of a PUCCH is controlled based on a TPC command (also referred to as a value, an increase/decrease value, a correction value, an indication value, and the like) indicated by the value of a field (also referred to as a TPC command field, a first field, and the like) in DCI.

For example, by using an index 1 of a power control adjustment state (PUCCH power control adjustment state), a transmission power ($P_{PUCCH,b,f,c}(i,q_u,q_d, 1)$) [dBm] of a PUCCH in a PUCCH transmission occasion (also referred to as a transmission period and the like) i for the active UL BWP b in the carrier f of the serving cell c may be based on at least one of $P_{CMAX,f,c}(i)$, $P_{O\_PUCCH,b,f,c}(q_u)$, $M^{PUCCH}_{RB,b,f,c}(i)$, $PL_{b,f,c}(q_d)$, $\Delta_{F\_PUCCH}(F)$, $\Delta T_{F,b,f,c}(i)$, and $g_{b,f,c}(i,l)$. The power control adjustment state may be referred to as a value based on a TPC command with the power control adjustment state index 1, an accumulated value of TPC commands, and a closed loop value. 1 may be referred to as a closed loop index.

The PUCCH transmission occasion i is a period in which a PUCCH is transmitted and may be constituted of one or more symbols, one or more slots, or the like, for example.

$P_{CMAX,f,c}(i)$ is, for example, a transmission power (also referred to as the maximum transmission power, the UE maximum output power, and the like) of a user terminal configured for the carrier f of the serving cell c in the transmission occasion i. $P_{O\_PUCCH,b,f,c}(q_u)$ is, for example, a parameter related to a target received power configured for the active UL BWP b in the carrier f of the serving cell c in the transmission occasion i (for example, also referred to as a parameter related to a transmission power offset, a transmission power offset P0, or a target received power parameter, and the like).

$M^{PUCCH}_{RB,b,f,c}(i)$ is, for example, the number of resource blocks (bandwidth) allocated to a PUCCH for the transmission occasion i in the active UL BWP b in the carrier f of the serving cell c with subcarrier spacing μ. $PL_{b,f,c}(q_d)$ is, for example, pathloss (pathloss estimation [dB], pathloss compensation) calculated by the user terminal by using the index $q_d$ of a reference signal (pathloss reference RS, RS for pathloss reference, DL-RS for pathloss measurement, PUCCH-PathlossReferenceRS) for downlink BWP associated with the active UL BWP b in the carrier f of the serving cell c.

If the UE is not given a pathloss reference RS (pathlossReferenceRSs) or before the UE is given a dedicated higher layer parameter, the UE calculates the pathloss $PL_{b,f,c}(q_d)$ by using an RS resource obtained by an SS/PBCH block used by the UE to acquire an MIB.

If the UE is given pathloss reference RS information (pathlossReferenceRSs in PUCCH power control information (PUCCH-PowerControl)) and is not given PUCCH spatial relation information (PUCCH-SpatialRelationInfo), the UE acquires the value of a reference signal (referencesignal) in the pathloss reference RS for PUCCH based on a pathloss reference RS-ID for PUCCH (PUCCH-Pathloss-ReferenceRS-Id) with an index 0 in pathloss reference RS information for PUCCH (PUCCH-PathlossReferenceRS). The resource of this reference signal is either in the same serving cell or a serving cell indicated by the value of pathloss reference linking information (pathlossReferenceLinking) if given. The pathloss reference linking information indicates which one of DLs between a special cell (SpCell) and a secondary cell (SCell) corresponding to this UL the UE uses as pathloss reference. The SpCell may be a primary cell (PCell) in a master cell group (MCG) or may be a primary secondary cell (PSCell) in a secondary cell group (SCG). The pathloss reference RS information indicates a set of reference signals (for example, CSI-RS configurations or SS/PBCH blocks) used for PUCCH pathloss estimation.

$\Delta_{F\_PUCCH}(F)$ is a higher layer parameter given for each PUCCH format. $\Delta_{TF,b,f,c}(i)$ is a transmission power adjustment component (offset) for the UL BWP b in the carrier f of the serving cell c.

$g_{b,f,c}(i,l)$ is a value based on the TPC command with the power control adjustment state index 1 of the active UL BWP in the carrier f of the serving cell c and the transmission occasion i (for example, the power control adjustment state, the accumulated value of TPC commands, the closed loop value, and the PUCCH power adjustment state). For example, $g_{b,f,c}(i,l)$ may be based on $\delta_{PUCCH,b,f,c}(i,l)$.

Here, $\delta_{PUCCH,b,f,c}(i,l)$ is a TPC command value and may be included in DCI format 1_0 or DCI format 1_1 detected by the UE in the PUCCH transmission occasion i in the active UL BWP b in the carrier f of the serving cell c or combined with a different TPC command in DCI format 2_2 with CRC scrambled with a particular RNTI (Radio Network Temporary Identifier) (for example, TPC-PUSCH-RNTI), for coding.

$\Sigma_{m=0}^{C(C_i)-1}\delta_{PUCCH,b,f,c}(m,l)$ may be the total of the TPC command values in a set $C_i$ of TPC command values with cardinality $C(C_i)$. $C_i$ may be a set of TPC command values the UE receives for the PUCCH power control adjustment state 1 between $K_{PUCCH}(i-i_0)-1$ symbols before a PUCCH transmission occasion $i-i_0$ and $K_{PUCCH}(i)$ symbols before the PUSCH transmission occasion i in the active UL BWP b in the carrier f of the serving cell c. $i_0$ may be the minimum positive integer that allows $K_{PUCCH}(i-i_0)$ symbols before the PUSCH transmission occasion $i-i_0$ to be earlier than $K_{PUCCH}(i)$ symbols before the PUSCH transmission occasion i.

If PUCCH transmission corresponds to detection of DCI format 1_0 or DCI format 1_1 by the UE, $K_{PUCCH}(i)$ may be the number of symbols in the active UL BWP b in the carrier f of the serving cell c after the last symbol of the corresponding PDCCH reception and before the first symbol of the PUCCH transmission. If the PUCCH transmission is configured by configured grant configuration information (ConfiguredGrantConfig), $K_{PUSCH}(i)$ may be the number of $K_{PUCCH,min}$ symbols equal to the product of the number $N_{symb}^{slot}$ of symbols per slot in the active UL BWP b in the carrier f of the serving cell c and the smallest value of the values provided by k2 in PUSCH common configuration information (PUSCH-ConfigCommon).

If the UE is provided with information indicating use of two PUCCH power control adjustment states (twoPUCCH-PC-AdjustmentStates) and PUCCH spatial relation information (PUCCH-SpatialRelationInfo), l may be l={0, 1}. If the UE is not provided with the information indicating use of two PUCCH power control adjustment states or PUCCH spatial relation information, l may be l=0.

If the UE obtains a TPC command value from DCI format 1_0 or 1_1 and the UE is provided with the PUCCH spatial relation information, the UE may obtain mapping between a PUCCH spatial relation information ID (pucch-SpatialRelationInfoId) value and a closed loop index (closedLoopIndex, power adjustment state index l), by an index provided by ID of P0 for PUCCH (p0-PUCCH-Id in p0-Set in PUCCH-PowerControl in PUCCH-Config). When the UE receives an activation command including the value of the PUCCH spatial relation information ID, the UE may determine the value of the closed loop index providing the value l, via the link to the corresponding ID of P0 for PUCCH.

If the UE is provided with a configuration of a $P_{O\_PUCCH,b,f,c}(q_u)$ value for the corresponding PUCCH power adjustment stat l for the active UL BWP b in the carrier f of the serving cell c by a higher layer, $g_{b,f,c}(i,l)=0$ and k=0, 1, . . . , i hold. If the UE is provided with the PUCCH spatial relation information, the UE may determine the value l from a value $q_u$, based on the PUCCH spatial relation information associated with the ID of P0 for PUCCH corresponding to $q_u$ and the closed loop index value corresponding to l.

$q_u$ may be the ID of P0 for PUCCH (p0-PUCCH-Id) indicating P0 for PUCCH (P0-PUCCH) in a P0 set for PUCCH (p0-Set).

If the UE is not provided with the PUCCH spatial relation information (PUCCH-SpatialRelationInfo), the UE obtains the P0 value for PUCCH (p0-PUCCH-Value), based on the value of P0-PUCCH-ID equal to the smallest value of the P0-PUCCH-IDs (p0-PUCCH-Id) in the P0 set (p0-Set).

If the UE is given pathloss reference RSs (pathlossReferenceRSs) and is not given PUCCH spatial relation information (PUCCH-SpatialRelationInfo), the UE obtains the value of a reference signal (referenceSignal) in the PUCCH pathloss reference RSs, based on a PUCCH pathloss reference RS-ID (pucch-PathlossReferenceRS-Id) with an index 0 in a PUCCH pathloss reference RS (PUCCH-PathlossReferenceRS). An RS resource thus obtained is in the primary cell or in a serving cell indicated, if the pathloss reference linking (pathlossReferenceLinking) is provided, by the value of the pathloss reference linking.

If the UE is provided with the number of the PUCCH power control adjustment states maintained by the UE being two (twoPUCCH-PC-AdjustmentStates) and PUCCH spatial relation information, the PUCCH power control adjustment state (closed loop) index l is l∈{0,1}. If the UE is not provided with the number of the PUCCH power control adjustment states maintained by the UE being two or PUCCH spatial relation information, the PUCCH power control adjustment state (closed loop) index l is l=0.

In other words, if the UE is not provided with the PUCCH spatial relation information, P0, a PL-RS, and a closed loop index are determined according to a rule. In this case, the lowest P0-PUCCH-ID is used, PUCCH pathloss reference RS-ID=0 is used, and l=0 is used.

In an RRC information element (IE), a PUCCH power control information element (PUCCH-PowerControl) includes a P0 set (p0-Set), which is a set of P0s for PUCCH (P0-PUCCHs), and pathloss reference RSs (pathlossReferenceRSs), which constitute a set of PUCCH pathloss reference RSs (PUCCH-PathlossReferenceRS). P0 for PUCCH includes a P0-PUCCH-ID (P0-PUCCH-Id) and a P0 value for PUCCH (p0-PUCCH-Value). Each PUCCH pathloss reference RS includes a PUCCH pathloss reference RS-ID (PUCCH-PathlossReferenceRS-Id) and a reference signal (referenceSignal, SSB index, or NZP-CSI-RS resource ID).

(PUSCH Power Control)

In NR, the transmission power of a PUSCH is controlled based on a TPC command (also referred to as a value, an increase/decrease value, a correction value, and the like) indicated by the value of a field (also referred to as a TPC command field and the like) in DCI.

For example, when the UE transmits a PUSCH in the active UL BWP b in the carrier f of the serving cell c by using a parameter set with an index j (open-loop parameter set) and the index l of a power control adjustment state (PUSCH power control adjustment state), a transmission power ($P_{PUSCH,b,f,c}(i, j, q_d, l)$) [dBm] of a PUSCH in a PUSCH transmission occasion (also referred to as a transmission period and the like) i may be based on at least one of $_{PUSCH,b,f,c}(i,j,q_d,l)$, $P_{O\_PUSCH,b,f,c}(j)$, $M^{PUSCH}_{RB,b,f,c}(i)$, $\alpha_{b,f,c}(j)$, $PL_{b,f,c}(q_d)$, $\Delta_{TF,b,f,c}(i)$, and $f_{b,f,c}(i,l)$. The power control adjustment state may be referred to as a value based on a TPC command with the power control adjustment state index l, an accumulated value of TPC commands, and a closed loop value. l may be referred to as a closed loop index.

The PUSCH transmission occasion i is a period in which a PUSCH is transmitted and may be constituted of one or more symbols, one or more slots, or the like, for example.

$P_{CMAX,f,c(i)}$ is, for example, a transmission power (also referred to as the maximum transmission power, the UE maximum output power, and the like) of a user terminal configured for the carrier f of the serving cell c in the transmission occasion i. $P_{O\_PUSCH,b,f,c}(j)$ is, for example, a parameter related to a target received power configured for the active UL BWP b in the carrier f of the serving cell c in the transmission occasion i (for example, also referred to as a parameter related to a transmission power offset, a transmission power offset P0, a target received power parameter, and the like).

$M^{PUSCH}_{RB,b,f,c}(i)$ is, for example, the number of resource blocks (bandwidth) allocated to a PUSCH for the transmission occasion i in the active UL BWP b in the carrier f of the serving cell c with subcarrier spacing μ. $\alpha_{b,f,c}(j)$ is a value provided by a higher layer parameter (for example, also referred to as msg3-Alpha, p0-PUSCH-Alpha, a fractional factor, and the like).

$PL_{b,f,c}(q_d)$ is, for example, pathloss (pathloss estimation [dB], pathloss compensation) calculated by the user terminal by using the index $q_d$ of a reference signal (RS, pathloss reference RS, RS for pathloss reference, DL-RS for pathloss measurement, PUSCH-PathlossReferenceRS) for downlink BWP associated with the active UL BWP b in the carrier f of the serving cell c.

When the UE is not provided with a pathloss reference RS (for example, PUSCH-PathlossReferenceRS) or the UE is not provided with a dedicated higher layer parameter, the UE may calculate $PL_{b,f,c}(q_d)$ by using an RS resource, based on a synchronization signal (SS)/physical broadcast channel (PBCH) block (SS block (SSB)) used for obtaining a Master Information Block (MIB).

When the UE is configured with RS resource indices up to the number corresponding to the value of the maximum number of pathloss reference RSs (for example, maxNrof-PUSCH-PathlossReferenceRSs) and a set of RS configurations for each of the RS resource indices by pathloss reference RSs, the set of RS resource indices may include one of or both a set of SS/PBCH block indices and a set of channel state information (CSI)-reference signal (RS) resource indices. The UE may identify an RS resource index $q_d$ in the set of RS resource indices.

When PUSCH transmission is scheduled by a Random Access Response (RAR) UL grant, the UE may use the same RS resource index $q_d$ as that for corresponding PRACH transmission.

When the UE is provided with a configuration of power control of a PUSCH by a sounding reference signal (SRS) resource indicator (SRI) (for example, SRI-PUSCH-Power-Control) and is provided with one or more values of the ID(s) of pathloss reference RS(s), the UE may obtain mapping between a set of values for an SRI field in DCI format 0_1 and a set of ID value(s) of the pathloss reference RS(s) by higher layer signaling (for example, sri-PUSCH-PowerControl-Id in SRI-PUSCH-PowerControl). The UE may determine the RS resource index $q_d$, based on the ID of the pathloss reference RS mapped in the SRI field value in DCI format 0_1 for scheduling the PUSCH.

When the PUSCH transmission is scheduled by DCI format 0_0 and the UE is not provided with PUCCH spatial relation information for a PUCCH resource with the lowest index for the active UL BWP b in each carrier f and serving cell c, the UE may use the same RS resource index $q_d$ as that for PUCCH transmission in the PUCCH resource.

When the PUSCH transmission is scheduled by DCI format 0_0 and the UE is not provided with spatial setting of the PUCCH transmission, when the PUSCH transmission is scheduled by DCI format 0_1 not including an SRI field, or when a configuration of power control of a PUSCH by an SRI is not provided to the UE, the UE may use the RS resource index $q_d$ with the pathloss reference RS ID of zero.

When a configured grant configuration (for example, ConfiguredGrantConfig) includes a particular parameter (for example, rrc-ConfiguredUplinkGrant) for PUSCH transmission configured by the configured grant configuration, an RS resource index $q_d$ may be provided to the UE by a pathloss reference index (for example, pathlossReferenceIndex) in the particular parameter.

When the configured grant configuration does not include the particular parameter for the PUSCH transmission configured by the configured grant configuration, the UE may determine the RS resource index $q_d$, based on the value of the ID of the pathloss reference RS mapped in the SRI field in the DCI format for activating the PUSCH transmission. When the DCI format does not include an SRI field, the UE may determine the RS resource index $q_d$ with the pathloss reference RS ID of zero.

$\Delta_{TF,b,f,c}(i)$ is a transmission power adjustment component (offset, transmission format compensation) for the UL BWP b in the carrier f of the serving cell c.

$f_{b,f,c}(i,l)$ is a PUSCH power control adjustment state for the active UL BWP b in the carrier f of the serving cell c in the transmission occasion i. $f_{b,f,c}(i,l)$ may be based on $\delta_{PUSCH,b,f,c}(i,l)$ $\delta_{PUSCH,b,f,c}(i,l)$ may be a TPC command value included in DCI format 0_0 or DCI format 0_1 for scheduling the PUSCH transmission occasion i in the active UL BWP b in the carrier f of the serving cell c or a TPC command obtained by being combined with a different TPC command in DCI format 2_2 with CRC scrambled with a particular RNTI (Radio Network Temporary Identifier) (for example, TPC-PUSCH-RNTI), for coding.

$\Sigma_{m=0}^{C(Di)-1}\delta_{PUCCH,b,f,c}(m,l)$ may be the total of the TPC command values in a set $D_i$ of TPC command values with cardinality $C(D_i)$. $D_i$ may be a set of TPC command values the UE receives for the PUSCH power control adjustment state l between $K_{PUSCH}(i-i_0)-1$ symbols before a PUSCH transmission occasion $i-i_0$ and $K_{PUSCH}(i)$ symbols before the PUSCH transmission occasion i in the active UL BWP b in the carrier f of the serving cell c. $i_0$ may be the minimum positive integer that allows $K_{PUSCH}(i-i_0)$ symbols before the PUSCH transmission occasion $i-i_0$ to be earlier than $K_{PUSCH}(i)$ symbols before the PUSCH transmission occasion i.

If PUSCH transmission is scheduled by DCI format 0_0 or DCI format 0_1, $K_{PUSCH}(i)$ may be the number of symbols in the active UL BWP b in the carrier f of the serving cell c after the last symbol of the corresponding PDCCH reception and before the first symbol of the PUSCH transmission. If the PUSCH transmission is configured by configured grant configuration information (ConfiguredGrantConfig), $K_{PUSCH}(i)$ may be the number of $K_{PUSCH,min}$ symbols equal to the product of the number Nsymbslot of symbols per slot in the active UL BWP b in the carrier f of the serving cell c and the smallest value of the values provided by k2 in PUSCH common configuration information (PUSCH-ConfigCommon).

The power control adjustment state may be configured with whether to have a plurality of states (for example, two states) or a single state by a higher layer parameter. When a plurality of power control adjustment states are configured, one of the plurality of power control adjustment states may be identified by the index l (for example, $l\in\{0,1\}$).

P0/α/PL-RS/closed loop index is determined according to a rule in cases 1 to 4 below.

{Case 1}

If PUSCH transmission excluding PUSCH retransmission corresponding to an RAR UL grant is scheduled by a DCI format not including an SRI field or if an SRI-PUSCH power control information element (SRI-PUSCH-PowerControl) is not provided to the UE, j=2 and the UE follows operation 1 below.

{{Operation 1}}

If a P0 set for PUSCH (P0-PUSCH-Set-r16) is provided to the UE and the DCI format includes an open-loop power control parameter set indication field, the UE determines the value of $P_{O\_PUSCH,b,f,c}(\ )$ from among values 1, 2, and 3 below. Otherwise, the UE determines the value of $P_{O\_PUSCH,b,f,c}(j)$ based on the value of the first set (P0-PUSCH-AlphaSet) in P0-Alpha sets (p0-AlphaSets).

{{{Value 1}}} If the value of the open-loop power control parameter set indication field is '0' or '00,' the first set (P0-PUSCH-AlphaSet) in the P0-Alpha sets (p0-AlphaSets).

{{{Value 2}}} If the value of the open-loop power control parameter set indication field is '1' or '01,' the first value in the P0 set for PUSCH (P0-PUSCH-Set-r16) with the smallest ID value of P0 set for PUSCH (p0-PUSCH-SetID).

{{{Value 3}}} If the value of the open-loop power control parameter set indication field is '11,' the second value in the P0 set for PUSCH (P0-PUSCH-Set-r16) with the smallest ID value of P0 set for PUSCH (p0-PUSCH-SetID).

In this way, the first P0-Alpha set for PUSCH (P0-PUSCH-AlphaSet) is used, and the P0 set for PUSCH (P0-PUSCH-Set-r16) with the smallest ID value of the P0 set for PUSCH (p0-PUSCH-SetID) in some cases.

{Case 2}

If PUSCH transmission excluding PUSCH retransmission corresponding to an RAR UL grant is scheduled by a DCI format not including an SRI field or if an SRI-PUSCH power control information element (SRI-PUSCH-PowerControl) is not provided to the UE, j=2 and the UE determines $\alpha_{b,f,c}(j)$ from the first P0-Alpha set for PUSCH in the P0-Alpha sets.

{Case 3}

If the UE is not configured with a PUSCH pathloss reference RS (PUSCH-PathlossReferenceRS) and an enable default beam PL for SRS information element (enableDefaultBeamPL-ForSRS-r16) or before a dedicated higher layer parameter is used for the UE, the UE calculates $PL_{b,f,c}(q_d)$ by using an RS resource based on the same SS/PBCH block index as the SS/PBCH block index used by the UE to obtain an MIB. If the PUSCH transmission is scheduled by DCI format 0_0 and the UE is not provided with spatial setting for the PUCCH transmission, or if the PUSCH transmission is scheduled by DCI format 0_0 not including an SRI field, or if an SRI-PUSCH power control information element (SRI-PUSCH-PowerControl) is not provided to the UE, the UE determines the RS resource index $q_d$ by using the PUSCH pathloss reference RS-ID (PUSCH-PathlossReferenceRS-Id) equal to zero. Here, the RS resource is in the serving cell when the serving cell c is provided or in a serving cell indicated by the value of the pathloss reference linking (pathlossReferenceLinking).

{Case 4}

The closed loop index l is determined based on the value j. If j>1 and the UE is not provided with an SRI-PUSCH power control information element (SRI-PUSCH-Power-Control) or if j=0, l=0.

In this way, the first P0-Alpha set for PUSCH (P0-PUSCH-AlphaSet) is used, and a PUSCH pathloss reference RS-ID (PUSCH-PathlossReferenceRS-Id) of 0 is used in some cases.

In an RRC information element (IE), a PUSCH configuration (PUSCH-Config) includes a PUSCH power control information element (PUSCH-PowerControl) and a PUSCH power control information element for Rel. 16 (PUSCH-PowerControl-v1610). The PUSCH power control information element includes a list (p0-AlphaSets) of P0-Alpha sets for PUSCH (P0-PUSCH-AlphaSet) and a list of PUSCH pathloss reference RSs (PUSCH-PathlossReferenceRS). Each P0-Alpha set for PUSCH includes an ID of P0-Alpha set for PUSCH (P0-PUSCH-AlphaSetId), P0, and Alpha. Each PUSCH pathloss reference RS includes a PUSCH pathloss reference RS-ID (PUSCH-PathlossReferenceRS-Id) and a reference signal (referenceSignal, SSB index or NZP-CSI-RS resource ID).

The PUSCH power control information element for Rel. 16 includes a list (P0-PUSCH-SetList-r16) of P0 set for PUSCHs for Rel. 16 (P0-PUSCH-Set-r16). Each P0 set for PUSCH for Rel. 16 includes an ID of P0 set for PUSCH for Rel. 16 (P0-PUSCH-SetId-r16) and a list of P0s for PUSCH for Rel. 16 (P0-PUSCH-r16).

It is studied to support independent power control for each of different TRPs in frequency range (FR) 1 as multi-TRP enhancement for PUCCH.

It is not clear how the UE determines at least one of P0 for PUCCH, a PUCCH pathloss reference RS, and a closed loop index for each of the different TRPs when the UE is not provided with PUCCH spatial relation information, to support independent power control for each of different TRPs in FR1. In addition, it is not clear to which TRP the UE determines to transmit a PUCCH.

It is not clear how the UE determines at least one of P0 for PUSCH, a PUCCH pathloss reference RS, and a closed loop index for each of different TRPs when a PUSCH is scheduled by DCI without an SRI field or when the UE is not provided with an SRI-PUSCH empty power control information element, to support independent power control for each of the different TRPs. In addition, it is not clear to which TRP the UE determines to transmit a PUSCH.

Thus, the inventors of the present invention came up with a method of determining a power control parameter for a UL channel.

Embodiments according to the present disclosure will be described in detail with reference to the drawings as follows. The radio communication methods according to respective embodiments may each be employed individually, or may be employed in combination.

In the present disclosure, "A/B/C" and "at least one of A, B, and C" may be interchangeably interpreted. In the present disclosure, a cell, a serving cell, a CC, a carrier, a BWP, a DL BWP, a UL BWP, an active DL BWP, an active UL BWP, and a band may be interchangeably interpreted. In the present disclosure, an index, an ID, an indicator, and a resource ID may be interchangeably interpreted. In the present disclosure, support, control, controllable, operate, and operable may be interchangeably interpreted.

In the present disclosure, configuration (configure), activation (activate), update, indication (indicate), enabling (enable), specification (specify), and selection (select) may be interchangeably interpreted.

In the present disclosure, link, associate, correspond, and map may be interchangeably interpreted. In the present disclosure, allocate, assign, monitor, and map may be interchangeably interpreted.

In the present disclosure, the higher layer signaling may be, for example, any one or combinations of Radio Resource Control (RRC) signaling, Medium Access Control (MAC) signaling, broadcast information, and the like. In the present disclosure, RRC, RRC signaling, an RRC parameter, a higher layer, a higher layer parameter, an RRC information element (IE), and an RRC message may be interchangeably interpreted.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, a MAC CE and an activation/deactivation command may be interchangeably interpreted.

In the present disclosure, a beam, a spatial domain filter, spatial setting, a TCI state, a UL TCI state, a unified TCI state, a unified beam, a common TCI state, a common beam, TCI assumption, QCL assumption, a QCL parameter, a spatial domain reception filter, a UE spatial domain reception filter, a UE receive beam, a DL beam, a DL receive beam, DL precoding, a DL precoder, a DL-RS, an RS of QCL type D in a TCI state/QCL assumption, an RS of QCL type A in a TCI state/QCL assumption, a spatial relation, a spatial domain transmission filter, a UE spatial domain transmission filter, a UE transmit beam, a UL beam, a UL transmit beam, UL precoding, a UL precoder, and a PL-RS may be interchangeably interpreted. In the present disclosure, a QCL type X-RS, a DL-RS associated with QCL type X, a DL-RS having QCL type X, a DL-RS source, an SSB, a CSI-RS, and an SRS may be interchangeably interpreted.

In the present disclosure, a panel, an Uplink (UL) transmission entity, a TRP, a spatial relation, a control resource set (CORESET), a PDSCH, a codeword, a base station, an antenna port for a certain signal (for example, a demodulation reference signal (DMRS) port), an antenna port group for a certain signal (for example, a DMRS port group), a group for multiplexing (for example, a code division multiplexing (CDM) group, a reference signal group, or a CORESET group), a CORESET pool, a CORESET subset, a CW, a redundancy version (RV), and a layer (MIMO layer, transmission layer, spatial layer) may be interchangeably interpreted. A panel Identifier (ID) and a panel may be interchangeably interpreted. In the present disclosure, a TRP index, a TRP ID, a CORESET pool index, the ordinal number (first, second) of a TCI of two TCI states, and a TRP may be interchangeably interpreted.

In the present disclosure, a TRP, a transmission point, a panel, a DMRS port group, a CORESET pool, and one of two TCI states associated with one codepoint of a TCI field may be interchangeably interpreted.

In the present disclosure, a single TRP, a single-TRP system, single-TRP transmission, and a single PDSCH may be interchangeably interpreted. In the present disclosure, multi-TRP, multi-TRP system, multi-TRP transmission, and multi-PDSCH may be interchangeably interpreted. In the present disclosure, single DCI, a single PDCCH, multi-TRP based on single DCI, and two TCI states in at least one TCI codepoint being activated may be interchangeably interpreted.

In the present disclosure, a single TRP, a channel using a single TRP, a channel using one TCI state/spatial relation, multi-TRP being not enabled by RRC/DCI, a plurality of TCI states/spatial relations being not enabled by RRC/DCI, and one CORESET pool index (CORESETPoolIndex) value being not configured for any CORESET and any codepoint of a TCI field being not mapped to two TCI states may be interchangeably interpreted.

In the present disclosure, multi-TRP, a channel using multi-TRP, a channel using a plurality of TCI states/spatial relations, multi-TRP being enabled by RRC/DCI, a plurality of TCI states/spatial relations being enabled by RRC/DCI, and at least one of multi-TRP based on single DCI and multi-TRP based on multi-DCI may be interchangeably interpreted.

In the present disclosure, multi-TRP based on multi-DCI, multi-DCI based multi-TRP, one CORESET pool index (CORESETPoolIndex) value being configured for a CORESET, and a CORESET pool index being configured for one or more CORESETs and a different CORESET pool index=0 or 1 being configured for each CORESET may be interchangeably interpreted.

In the present disclosure, multi-TRP based on single DCI, single-DCI based multi-TRP, at least one codepoint of a TCI field being mapped to two TCI states, a CORESET pool index being not configured for a CORESET, and the same CORESET pool index being configured for all CORESETs may be interchangeably interpreted.

In the present disclosure, TRP1 (first TRP) may correspond to CORESET pool index=0 or correspond to a first TCI state of two TCI states corresponding to one codepoint of a TCI field. TRP2 (second TRP) may correspond to CORESET pool index=1 or correspond to a second TCI state of the two TCI states corresponding to the one codepoint of the TCI field.

In the present disclosure, a PUCCH, a PUSCH, repetition, and transmission occasion may be interchangeably interpreted.

(Radio Communication Method)

A DCI field of a TPC command for PUCCH may be enhanced. Two DCI fields of this TPC command may correspond to the first TRP and the second TRP.

A DCI field of a TPC command for PUSCH/an SRI for PUSCH may be enhanced. Two DCI fields of this TPC command/SRI may correspond to the first TRP and the second TRP.

When PUCCH spatial relation information is not provided, a UE may determine two values of a power control parameter and transmit a PUCCH by using at least one of the two values of the power control parameter and one or more transmission occasions.

When a PUSCH is scheduled by downlink control information not including an SRI field or when an SRI-PUSCH power control information element is not provided, the UE may determine two values of a power control parameter and transmit a PUSCH by using at least one of the two values of the power control parameter and one or more transmission occasions.

The two values may be associated with two respective indices (for example, indices associated with TRPs). The two indices may be either two index values of a CORESET pool index or two index values of a TCI state associated with one codepoint of a field in downlink control information.

First Embodiment

A description will be given of a method for a UE to determine at least one of P0 for PUCCH, a PUCCH pathloss reference RS (PLRS for PUCCH), and a closed loop index for each of different TRPs.

If the UE is not provided with PUCCH spatial relation information, the UE may determine a power control parameter to be used for PUCCH transmission to a particular TRP in the following method. The power control parameter may be at least one of P0 for PUCCH, a PLRS for PUCCH, and a closed loop index.

<<Aspect 1-1>> P0 for PUCCH

If the UE is not provided with PUCCH spatial relation information, the UE may follow any of aspects 1-1-1 to 1-1-4 below for P0 for PUCCH.

{Aspect 1-1-1}

Two P0 sets are configured for two respective TRPs. The UE uses P0 for PUCCH with the lowest ID in a corresponding P0 set, for PUCCH transmission to each TRP.

FIG. 1A is a diagram to show an example of a configuration of P0s for PUCCH according to aspect 1-1-1.

In this example, a P0 set for TRP1 (P0-Set-TRP1) and a P0 set for TRP2 (P0-Set-TRP2) are configured. The P0 set for TRP1 includes P0 for PUCCH with ID (P0-PUCCH-ID) =0 and P0 for PUCCH with ID=1. The P0 set for TRP2 includes P0 for PUCCH with ID=2 and P0 for PUCCH with ID=3. In the P0 set for TRP1, P0 for PUCCH with the lowest ID (0) is used for PUCCH transmission to TRP1. In the P0 set for TRP2, P0 for PUCCH with the lowest ID (2) is used for PUCCH transmission to TRP2.

{Aspect 1-1-2}

One P0 set is configured. From the P0 set, two P0s for PUCCH for two respective TRPs are determined based on a rule. For example, the UE uses P0 for PUCCH with the lowest ID (for example, 0) for PUCCH transmission to the first TRP while using P0 for PUCCH with the second lowest ID (for example, 1) for PUCCH transmission to the second TRP.

FIG. 1B is a diagram to show an example of a configuration of P0s for PUCCH according to aspect 1-1-2.

In this example, one P0 set (P0-Set) is configured. This P0 set includes P0 for PUCCH with ID=0, P0 for PUCCH with ID=1, P0 for PUCCH with ID=2, and P0 for PUCCH with ID=3. In the P0 set, P0 for PUCCH with the lowest ID (0) is used for PUCCH transmission to TRP1. In the P0 set, P0 for PUCCH with the second lowest ID (1) is used for PUCCH transmission to TRP2.

{Aspect 1-1-3}

One P0 set is configured. In the P0 set, two subsets of P0s for PUCCH are explicitly/implicitly configured for two respective TRPs. For example, first K P0s for PUCCH (first subset) are configured for the first TRP, while the (K+1)-th to the largest-numbered P0s for PUCCH (second subset) are configured for the second TRP. The UE uses P0 for PUCCH with the lowest ID in the corresponding subset, for PUCCH transmission to each TRP.

K may be configured, may be defined in a specification, or may depend on UE capability.

FIG. 1C is a diagram to show an example of a configuration of P0s for PUCCH according to aspect 1-1-3.

In this example, one P0 set is configured. This P0 set includes a subset for TRP1 (Sub-set-TRP1) and a subset for TRP2 (Sub-set-TRP2). The subset for TRP1 includes P0 for PUCCH with ID=0 and P0 for PUCCH with ID=1. The subset for TRP2 includes P0 for PUCCH with ID=2 and P0 for PUCCH with ID=3. In the subset for TRP1, P0 for PUCCH with the lowest ID (0) is used for PUCCH transmission to TRP1. In the subset for TRP2, P0 for PUCCH with the lowest ID (2, K) is used for PUCCH transmission to TRP2.

{Aspect 1-1-4}

Two values of P0 for PUCCH used for a multi-TRP case are explicitly configured for two respective TRPs. The UE uses corresponding (configured) P0 for PUCCH, for PUCCH transmission to each TRP.

To which one of TRP1 (first TRP) and TRP2 (second TRP) the UE transmits a PUCCH may be according to a second embodiment.

<<Aspect 1-2>> PLRS for PUCCH

If the UE is not provided with PUCCH spatial relation information, the UE may follow any of aspects 1-2-1 to 1-2-4 below for a PLRS for PUCCH.

{Aspect 1-2-1}

Two sets of PLRSs for PUCCH are configured for two respective TRPs. The UE uses a PLRS with the lowest ID (for example, 0) in the corresponding set, for PUCCH transmission to each TRP.

FIG. 2A is a diagram to show an example of a configuration of PLRSs for PUCCH according to aspect 1-2-1.

In this example, a PLRS set for TRP1 (pathlossRS-TRP1) and a P0 set for TRP2 (pathlossRS-TRP2) are configured. The PLRS set for TRP1 includes a PLRS for PUCCH with ID=0 and a PLRS for PUCCH with ID=1. The PLRS set for TRP2 includes a PLRS for PUCCH with ID=2 and a PLRS for PUCCH with ID=3. In the PLRS set for TRP1, the PLRS for PUCCH with the lowest ID (0) is used for PUCCH transmission to TRP1. In the PLRS set for TRP2, the PLRS for PUCCH with the lowest ID (2) is used for PUCCH transmission to TRP2.

{Aspect 1-2-2}

One set of PLRSs for PUCCH is configured. From the set, two PLRSs for PUCCH for two respective TRPs are determined based on a rule. For example, the UE uses the PLRS for PUCCH with the lowest ID (for example, 0) for PUCCH transmission to the first TRP while using the PLRS for PUCCH with the second lowest ID (for example, 1) for PUCCH transmission to the second TRP.

FIG. 2B is a diagram to show an example of a configuration of PLRSs for PUCCH according to aspect 1-2-2.

In this example, one set of PLRSs for PUCCH (patlossRS) is configured. This set includes a PLRS for PUCCH with ID=0, a PLRS for PUCCH with ID=1, a PLRS for PUCCH with ID=2, and a PLRS for PUCCH with ID=3. In the set, the PLRS for PUCCH with the lowest ID (0) is used for PUCCH transmission to TRP1. In the set, the PLRS for PUCCH with the second lowest ID (1) is used for PUCCH transmission to TRP2.

{Aspect 1-2-3}

One set of PLRSs for PUCCH is configured. In the set, two subsets of PLRSs for PUCCH are explicitly/implicitly configured for two respective TRPs. For example, first K PLRSs for PUCCH (first subset) are configured for the first TRP, while the (K+1)-th to the largest-numbered PLRSs for PUCCH (second subset) are configured for the second TRP. The UE uses the PLRS for PUCCH with the lowest ID in the corresponding subset, for PUCCH transmission to each TRP.

K may be configured, may be defined in a specification, or may depend on UE capability.

FIG. 2C is a diagram to show an example of a configuration of PLRSs for PUCCH according to aspect 1-2-3.

In this example, one set of PLRSs for PUCCH (pathlossRS) is configured. This set includes a subset for TRP1 (Sub-set-TRP1) and a subset for TRP2 (Sub-set-TRP2). The subset for TRP1 includes a PLRS for PUCCH with ID=0 and a PLRS for PUCCH with ID=1. The subset for TRP2 includes a PLRS for PUCCH with ID=2 and a PLRS for PUCCH with ID=3. In the subset for TRP1, the PLRS for PUCCH with the lowest ID (0) is used for PUCCH transmission to TRP1. In the subset for TRP2, the PLRS for PUCCH with the lowest ID (2, K) is used for PUCCH transmission to TRP2.

{Aspect 1-2-4}

Two PLRSs for PUCCH used for a multi-TRP case are explicitly configured for two respective TRPs. The UE uses a corresponding (configured) PLRS for PUCCH, for PUCCH transmission to each TRP.

To which one of TRP1 (first TRP) and TRP2 (second TRP) the UE transmits a PUCCH may be according to the second embodiment.

<<Aspect 1-3>> Closed Loop Index for PUCCH

If the UE is not provided with PUCCH spatial relation information, the UE may follow any of aspects 1-3-1 to 1-3-3 below for a closed loop index l for PUCCH.

{Aspect 1-3-1}

If the UE is not provided with PUCCH spatial relation information, the UE may use l=0 for PUCCH transmission to the first TRP while using l=1 for PUCCH transmission to the second TRP.

{Aspect 1-3-2}

Candidate values for the closed loop index for the multi-TRP case may be enhanced to l={0_0, 0_1, 1_0, 1_1}. Here, {0_0, 0_1} may be candidate values for the first TRP. {1_0, 1_1} may be candidate values for the second TRP. If the UE is not provided with PUCCH spatial relation information, the UE may use l=0_0 for PUCCH transmission to the first TRP while using l=1_0 for PUCCH transmission to the second TRP.

{Aspect 1-3-3}

A closed loop power control adjustment state $g_{b,f,c}(i,l)$ may be enhanced to $g_{b,f,c}(i,l,x)$. A TPC command value $\delta_{PUCCH,b,f,c}(m,l)$ may be enhanced to $\delta_{PUCCH,b,f,c}(m,l,x)$. Here, x may denote a TRP index. If the UE is not provided with PUCCH spatial relation information, the UE may use l=0 and x=0 for PUCCH transmission to the first TRP while using l=0 and x=1 for PUCCH transmission to the second TRP.

According to this embodiment, the UE can use an appropriate power control parameter for PUCCH transmission to a particular TRP.

Second Embodiment

A description will be given of a method for the UE to determine to which TRP the UE transmits a PUCCH.

The UE may use, for PUCCH transmission to one TRP based on a second embodiment, at least one of P0 for PUCCH, a PUCCH pathloss reference RS, and a closed loop index for the TRP determined based on the first embodiment.

<<Aspect 2-1>> PUCCH Transmission without Repetition

For PUCCH transmission without repetition, the UE may determine association between the PUCCH transmission and a TRP according to any one of aspects 2-1-1 to 2-1-6 below.

{Aspect 2-1-1}

The association is determined based on the CORESET pool index of a CORESET for the UE to detect DCI for dynamic PUCCH resource selection (PUCCH resource indication). The DCI may be, for example, DCI format 1_0/1_1/1_2.

This aspect may be applied only to multi-TRP based on multi-DCI.

{Aspect 2-1-2}

For each PUCCH resource/each PUCCH resource set/each PUCCH resource group/each PUCCH format, a TRP index/CORESET pool index is configured explicitly.

{Aspect 2-1-3}

A TRP index/CORESET pool index is explicitly configured together with the PUCCH resource ID for a periodically/semi-persistently configured PUCCH resource. Here, the periodically/semi-persistently configured PUCCH resource may be a PUCCH resource for CSI report (PUCCH-CSI-Resource) or an SR resource.

{Aspect 2-1-4}

A TRP index/CORESET pool index is explicitly indicated in DL scheduling DCI for dynamic PUCCH resource selection (PUCCH resource indication). The DCI may be, for example, DCI format 1_0/1_1/1_2.

{Aspect 2-1-5}

The association is implicitly configured by grouping of PUCCH resources/PUCCH resource sets. PUCCH resources/PUCCH resource sets in a first group may be used for PUCCH transmission to the first TRP. PUCCH resources/PUCCH resource sets in a second group may be used for PUCCH transmission to the second TRP.

{Aspect 2-1-6}

The TRP index/CORESET pool index is configured by RRC/activated by a MAC CE and is used until RRC reconfiguration or reception of a new MAC CE.

Any one of aspects 2-1-2 to 2-1-6 may be used for both multi-TRP based on single DCI and multi-TRP based on multi-DCI.

For the TRP index/CORESET pool index=0, the UE may use P0/PLRS/closed loop index for the first TRP in the first embodiment. For the TRP index/CORESET pool index=1, the UE may use P0/PLRS/closed loop index for the second TRP in the first embodiment.

<<Aspect 2-2>> PUCCH Repetition

For PUCCH repetition, whether a plurality of repetitions are associated with single TRP or multi-TRP may be according to aspects 2-2-1 to 2-2-5 below.

{Aspect 2-2-1}

Whether a plurality of repetitions are associated with a single TRP or multi-TRP is explicitly configured for each PUCCH resource/each PUCCH resource set/each PUCCH resource group/each PUCCH format.

{Aspect 2-2-2}

Whether a plurality of repetitions are associated with a single TRP or multi-TRP is explicitly configured together with the PUCCH resource ID for a PUCCH resource configured periodically/semi-persistently. Here, the periodically/semi-persistently configured PUCCH resource may be a PUCCH resource for CSI report (PUCCH-CSI-Resource) or an SR resource.

{Aspect 2-2-3}

Whether a plurality of repetitions are associated with a single TRP or multi-TRP is implicitly configured by grouping of PUCCH resources/PUCCH resource sets. The PUCCH resources/PUCCH resource sets in the first group may be used for PUCCH transmission to a single TRP. The PUCCH resources/PUCCH resource sets in the second group may be used for PUCCH transmission to multi-TRP.

{Aspect 2-2-4}

Whether a plurality of repetitions are associated with a single TRP or multi-TRP is explicitly configured in DCI for dynamic PUCCH resource selection (PUCCH resource indication). The DCI may be, for example, DCI format 1_0/1_1/1_2.

{Aspect 2-2-5}

Whether a plurality of repetitions are associated with a single TRP or multi-TRP is configured by RRC/activated by a MAC CE and is used until RRC reconfiguration or reception of a new MAC CE.

Any one of aspects 2-2-1 to 2-2-5 may be used for both multi-TRP based on single DCI and multi-TRP based on multi-DCI.

Based on any of aspects 2-2-1 to 2-2-5, when all the plurality of PUCCH repetitions are associated with a single TRP, with which TRP all the plurality of PUCCH repetitions are associated may be determined by using a method similar to that in aspect 2-1.

Figures 3A, 3B, 3C:
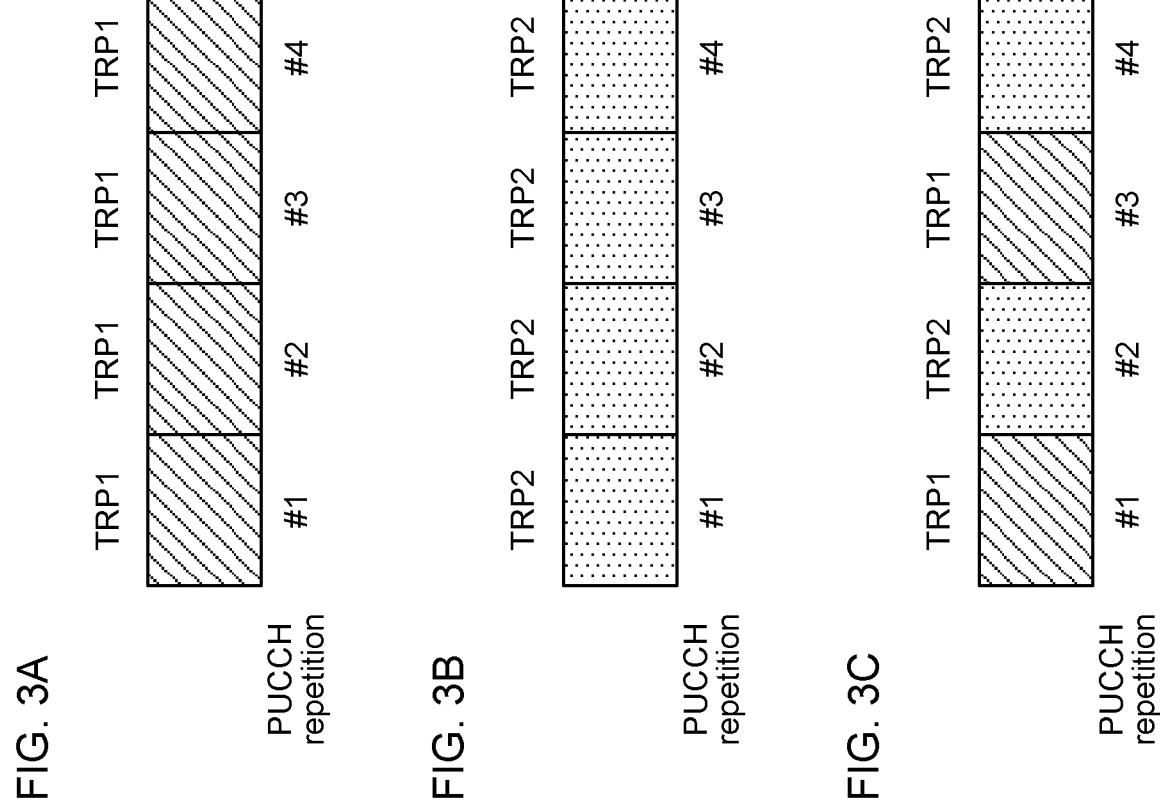
FIGS. 3A to 3C are diagrams to show examples of association between PUCCH repetition and a TRP(s) according to aspect 2-2.

In the example in FIG. 3A, PUCCH repetitions #1 to #4 are associated with TRP1 (single TRP). In the example in FIG. 3B, PUCCH repetitions #1 to #4 are associated with TRP2 (single TRP). In the example in FIG. 3C, PUCCH repetitions #1 and #3 are associated with TRP1, while PUCCH repetitions #2 and #4 are associated with TRP2. TRP1 and TRP2 (multi-TRP) may be associated with PUCCH repetitions by cyclic mapping to be described below.

If the plurality of PUCCH repetitions are associated with multi-TRP, mapping between PUCCH repetitions and TRPs may follow any of mappings 1 to 3 below.

{Mapping 1} Cyclic Mapping

Cyclic mapping pattern: first and second beams (TRPs) are used for first and second PUCCH repetitions, respectively. The same beam mapping pattern is continuously applied to remaining PUCCH repetitions.

Figure 4A:
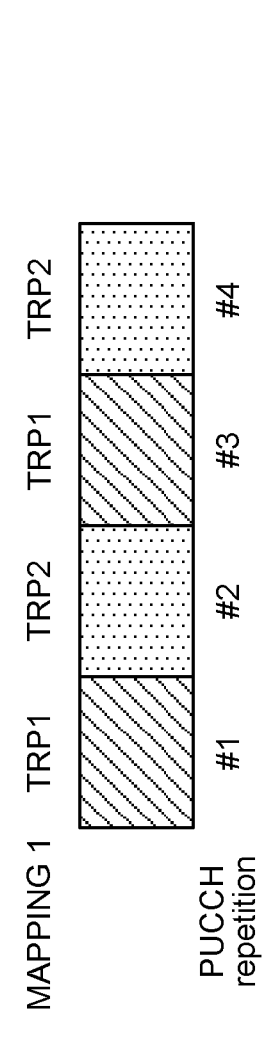
FIGS. 4A to 4C are diagrams to show examples of a mapping pattern according to aspect 2-2.

FIG. 4A shows an example of mapping 1. In this example, the number of PUCCH repetitions is four. PUCCH repetitions #1 and #3 are associated with TRP1, while PUCCH repetitions #2 and #4 are associated with TRP2.

{Mapping 2} Sequential Mapping

Sequential mapping pattern: a first beam (TRP) is used for first and second PUCCH repetitions. The second beam is used for third and fourth PUCCH repetitions. The same beam mapping pattern is continuously applied to remaining PUCCH repetitions.

Figure 4B:
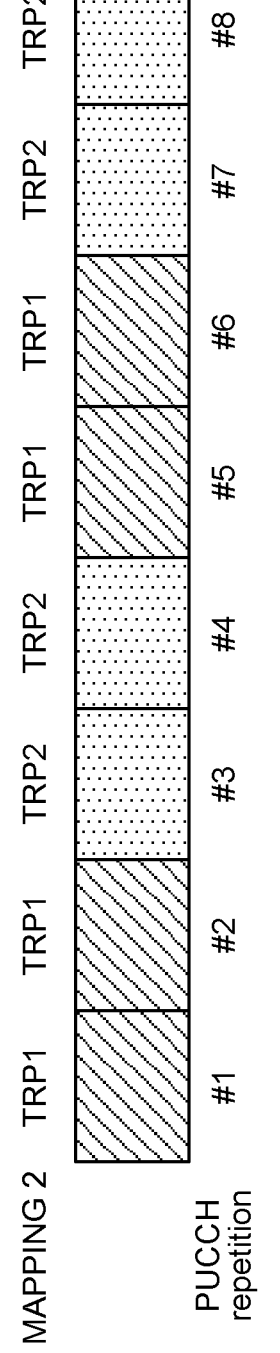

FIG. 4B shows an example of mapping 2. In this example, the number of PUCCH repetitions is eight. PUCCH repetitions #1 and #2 are associated with TRP1, while PUCCH repetitions #3 and #4 are associated with TRP2. This mapping pattern is repeated for PUCCH repetitions #5 to #8.

{Mapping 3} Half-Half Mapping

Among a plurality of PUCCH repetitions, PUCCH repetitions in the first half are mapped to the first TRP (beam). Among the plurality of PUCCH repetitions, PUCCH repetitions in the second half are mapped to the second TRP.

Figure 4C:
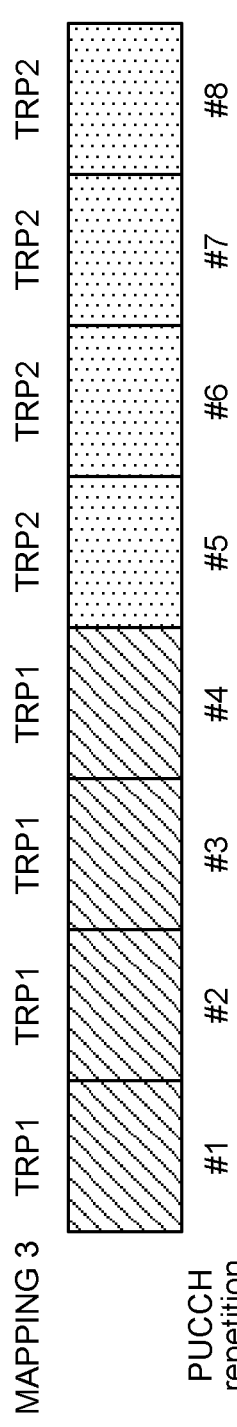

FIG. 4C shows an example of mapping 3. In this example, the number of PUCCH repetitions is eight. PUCCH repetitions #1 to #4 are associated with TRP1, while PUCCH repetitions #5 to #8 are associated with TRP2.

One or a plurality of these mapping patterns may be supported, and one mapping pattern may be configured by RRC.

According to this embodiment, the UE can perform PUCCH transmission to an appropriate TRP (by using an appropriate beam).

Third Embodiment

UE capability corresponding to at least one function (characteristics, feature) in the first and second embodiments may be defined. When the UE reports this UE capability, the UE may perform the corresponding function. When the UE reports this UE capability and a higher layer parameter corresponding to this function is configured, the UE may perform the corresponding function. The higher layer parameter (RRC information element) corresponding to this function may be defined. When this higher layer parameter is configured, the UE may perform the corresponding function.

The UE capability may indicate whether the UE supports this function.

The UE capability may be that, when the UE is not provided with PUCCH spatial relation information, the UE supports different P0/PLRS/closed loop index for PUCCH transmission to each of a plurality of different TRPs, for PUCCH transmission without repetition.

The UE capability may be that, when the UE is not provided with PUCCH spatial relation information, the UE supports different P0/PLRS/closed loop index for PUCCH repetitions of each of different PUCCHs to a plurality of different TRPs, for PUCCH repetition. For PUCCH repetitions of the same PUCCH, the UE may use the same power control parameter. For example, the UE may support the example in FIG. 3A and the example in FIG. 3B and need not necessarily support the example in FIG. 3C.

The UE capability may be that, when the UE is not provided with PUCCH spatial relation information, the UE supports different P0/PLRS/closed loop index for PUCCH repetitions of the same PUCCH to a plurality of different TRPs, for PUCCH repetition. For example, the UE may support the example in FIG. 3C.

The UE capability may be that, when the UE is not provided with PUCCH spatial relation information, the UE supports different P0/PLRS/closed loop index for each of a plurality of different TRPs, in at least one of a case of multi-TRP based on single DCI and a case of multi-TRP based on multi-DCI.

According to this embodiment, the UE can implement the above functions while maintaining compatibility with an existing specification.

Fourth Embodiment

A description will be given of a method for the UE to determine at least one of P0 for PUSCH, alpha, P0 for PUSCH for Rel. 16, a PUSCH pathloss reference RS (PLRS for PUSCH), and a closed loop index, for each of different TRPs.

When PUSCH transmission is scheduled by a DCI format not including an SRI field or if an SRI-PUSCH power control information element (SRI-PUSCH-PowerControl) is not provided to the UE, the UE may follow the following method to determine a power control parameter to be used for PUSCH transmission to a particular TRP. The power control parameter may be at least one of P0 for PUSCH, alpha, P0 for PUSCH for Rel. 16, a PLRS for PUSCH, and a closed loop index.

<<Aspect 4-1>> P0 for PUSCH/Alpha

If P0 set for PUSCH (P0-PUSCH-Set-r16) is not provided to the UE and PUSCH transmission is scheduled by a DCI format not including an SRI field, or if an SRI-PUSCH power control information element (SRI-PUSCH-Power-Control) is not provided to the UE (similar condition to that in case 2 above), the UE may follow any of aspects 4-1-1 to 4-1-4 below for P0 for PUSCH/alpha.

{Aspect 4-1-1}

Two lots of plural P0-Alpha sets (p0-AlphaSets) are configured for two respective TRPs. The UE uses, for PUSCH transmission to each TRP, P0 for PUSCH and alpha in the first P0-Alpha set for PUSCH (P0-PUSCH-AlphaSet) (with the lowest ID) in the corresponding plural P0-Alpha sets.

Figures 5A, 5B, 5C:
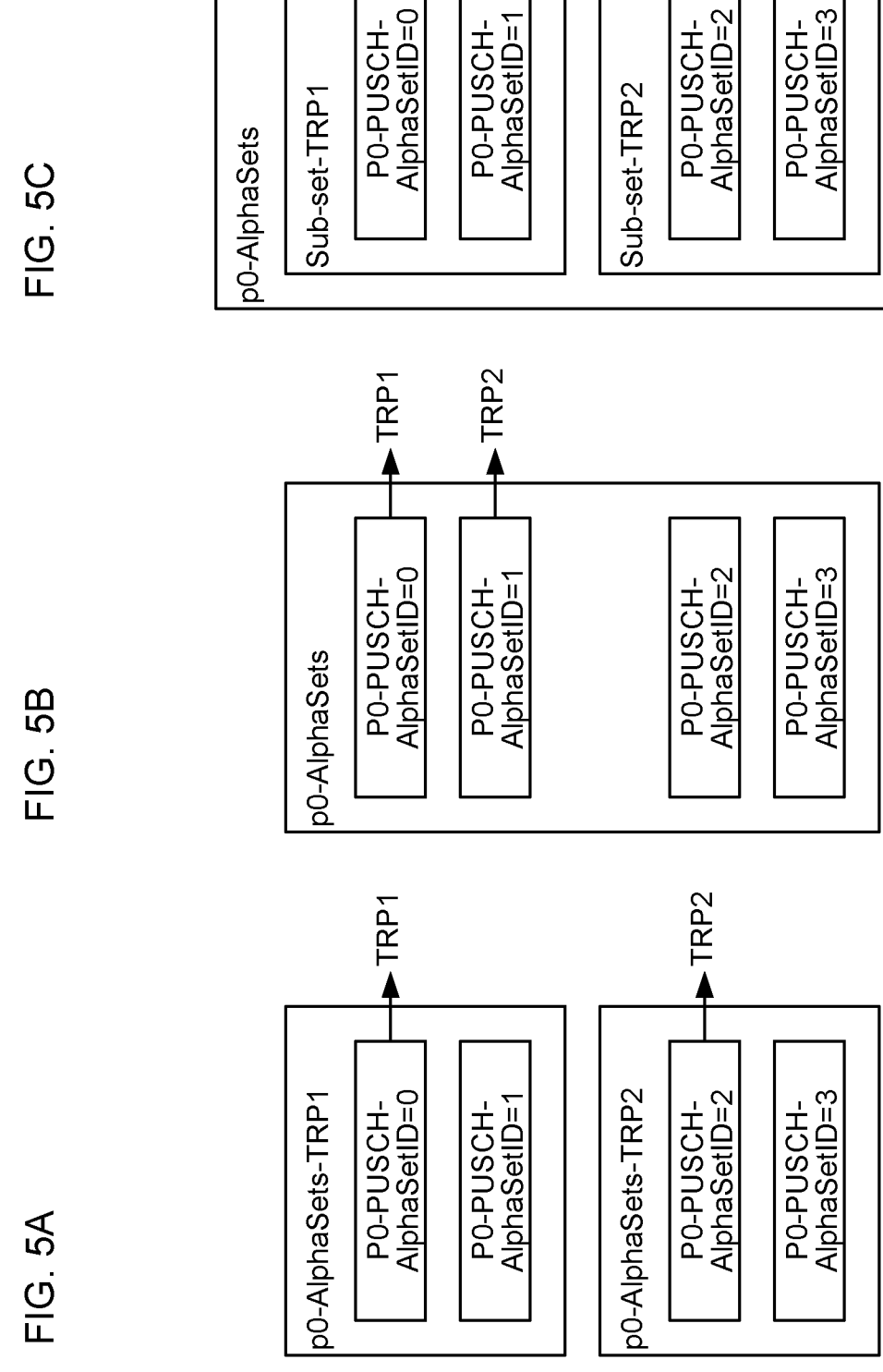
FIGS. 5A to 5C are diagrams to show examples of a configuration of P0 for PUSCH/alpha according to aspect 4-1.

FIG. 5A is a diagram to show an example of a configuration of P0 for PUSCH/alpha according to aspect 4-1-1.

In this example, plural P0-Alpha sets for TRP1 (p0-AlphaSets-TRP1) and plural P0-Alpha sets for TRP2 (p0-AlphaSets-TRP2) are configured. The plural P0-Alpha sets for TRP1 include a P0-Alpha set for PUSCH with ID (P0-PUSCH-AlphaSetId-r16)=0 and a P0-Alpha set for PUSCH with ID=1. The plural P0-Alpha sets for TRP2 include a P0-Alpha set for PUSCH with ID=2 and a P0-Alpha set for PUSCH with ID=3. The first P0-Alpha set for PUSCH of the plural P0-Alpha sets for TRP1 is used for PUSCH transmission to TRP1. The first P0-Alpha set for PUSCH of the plural P0-Alpha sets for TRP2 is used for PUSCH transmission to TRP2.

{Aspect 4-1-2}

One lot of plural P0-Alpha sets (p0-AlphaSets) is configured. From the plural P0-Alpha sets, two values of P0 for PUSCH and alpha (two P0-Alpha sets for PUSCH (P0-PUSCH-AlphaSet)) are determined for two respective TRPs, based on a rule. For example, the UE uses the first P0-Alpha set for PUSCH (with the lowest ID) for PUSCH transmission to the first TRP while using the second P0-Alpha set for PUSCH (with the second lowest ID) for PUSCH transmission to the second TRP.

FIG. 5B is a diagram to show an example of a configuration of P0 for PUSCH/alpha according to aspect 4-1-2.

In this example, one lot of plural P0-Alpha sets (p0-AlphaSets) is configured. The plural P0-Alpha sets include a P0-Alpha set for PUSCH with ID=0, a P0-Alpha set for PUSCH with ID=1, a P0-Alpha set for PUSCH with ID=2, and a P0-Alpha set for PUSCH with ID=3. The first P0-Alpha set for PUSCH of the plural P0-Alpha sets is used for PUSCH transmission to TRP1. The second P0-Alpha set for PUSCH of the plural P0-Alpha sets is used for PUSCH transmission to TRP2.

{Aspect 4-1-3}

One lot of plural P0-Alpha sets (p0-AlphaSets) is configured. In the P0 set, two subsets of P0-Alpha sets for PUSCH (P0-PUSCH-AlphaSet) are explicitly/implicitly configured for two respective TRPs. For example, first K P0-Alpha sets for PUSCH (first subset) are configured for the first TRP, while the (K+1)-th to the largest-numbered P0-Alpha sets for PUSCH (second subset) are configured for the second TRP. The UE uses the first P0-Alpha set for PUSCH (with the lowest ID) in the corresponding subset, for PUSCH transmission to each TRP.

K may be configured, may be defined in a specification, or may depend on UE capability.

FIG. 5C is a diagram to show an example of a configuration of P0 for PUSCH/alpha according to aspect 4-1-3.

In this example, one lot of plural P0-Alpha sets (p0-AlphaSets) is configured. The plural P0-Alpha sets include a subset for TRP1 (Sub-set-TRP1) and a subset for TRP2 (Sub-set-TRP2). The subset for TRP1 includes a P0-Alpha set for PUSCH with ID=0 and a P0-Alpha set for PUSCH with ID=1. The subset for TRP2 includes a P0-Alpha set for PUSCH with ID=2 and a P0-Alpha set for PUSCH with ID=3. The first P0-Alpha set for PUSCH in the subset for TRP1 is used for PUSCH transmission to TRP1. The first P0-Alpha set for PUSCH in the subset for TRP2 is used for PUSCH transmission to TRP2.

{Aspect 4-1-4}

Two values of P0 for PUSCH and alpha used for a multi-TRP case are explicitly configured for two respective TRPs. The UE uses corresponding (configured) P0 for PUSCH and alpha for PUSCH transmission to each TRP.

To which one of TRP1 (first TRP) and TRP2 (second TRP) the UE transmits a PUSCH may be according to a fifth embodiment.

<<Aspect 4-2>> P0 for PUSCH

If P0 set for PUSCH for Rel 16 (P0-PUSCH-Set-r16, P0 set for PUSCH for open-loop power control) is provided to the UE and PUSCH transmission is scheduled by a DCI format including an open-loop power control parameter set indication field, and the DCI format does not include an SRI field or an SRI-PUSCH power control information element (SRI-PUSCH-PowerControl) is not provided to the UE (similar condition to that in case 1 above), the UE may follow any of aspects 4-2-1 to 4-2-4 below for P0 for PUSCH.

{Aspect 4-2-1}

Two sets (list, P0-PUSCH-SetList-r16) of P0 set for PUSCHs for Rel. 16 (P0-PUSCH-Set-r16) are configured for two respective TRPs. The UE uses the first P0 set for PUSCH for Rel. 16 (with the lowest ID) in the corresponding list, for PUCCH transmission to each TRP.

Figures 6A, 6B, 6C:
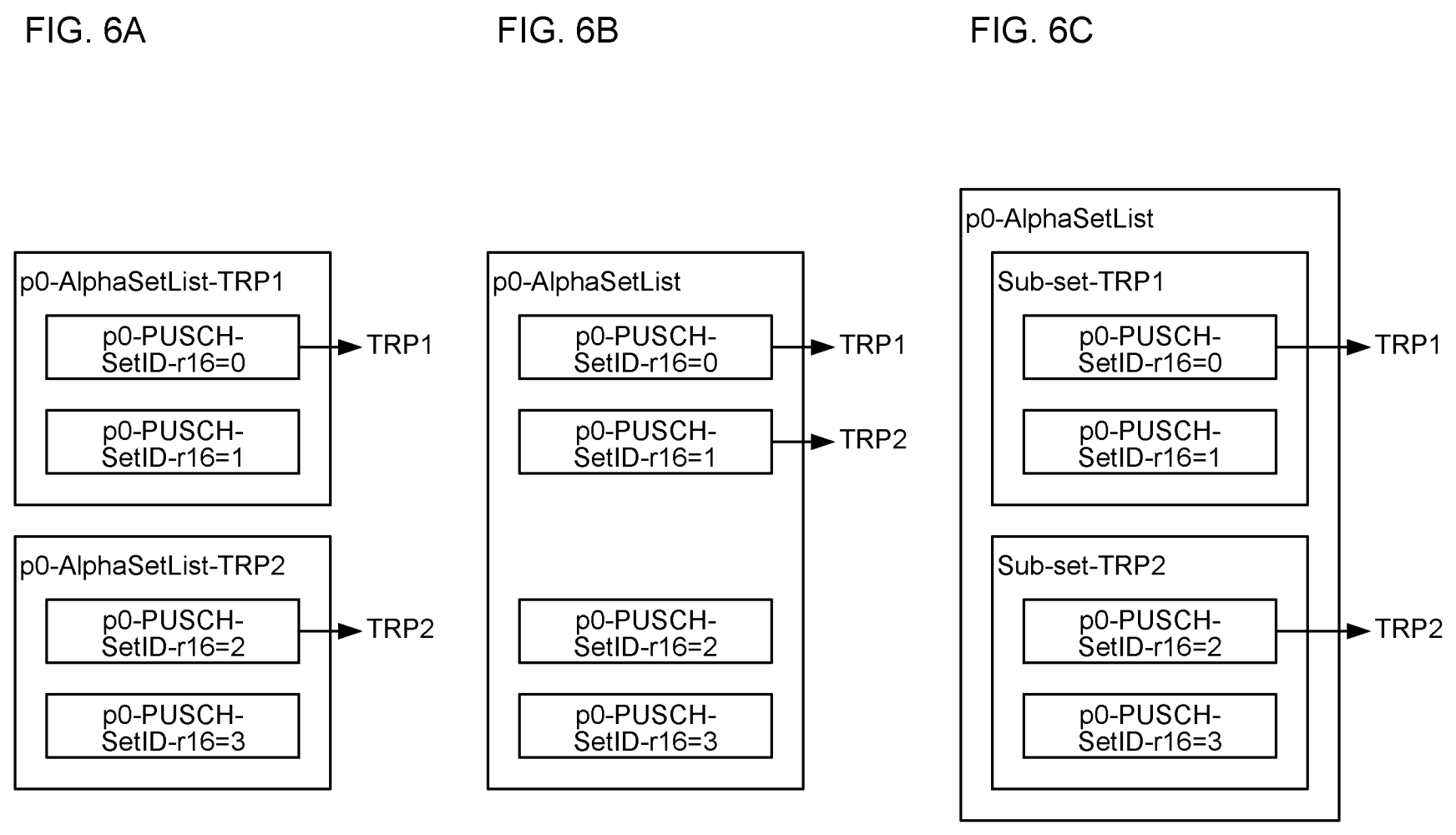

FIG. 6A is a diagram to show an example of a configuration of P0s for PUSCH according to aspect 4-2-1.

In this example, a P0 set list for PUSCH for TRP1 (p0-PUSCH-SetList-TRP1) and a P0 set list for PUSCH for TRP2 (p0-PUSCH-SetList-TRP2) are configured. The P0 set list for PUSCH for TRP1 includes P0 set for PUSCH with ID (P0-PUSCH-SetId)=0 and P0 set for PUSCH with ID=1. The P0 set list for PUSCH for TRP2 includes a P0 set for PUSCH with ID=2 and a P0 set for PUSCH with ID=3. The first P0 set for PUSCH in the P0 set list for PUSCH for TRP1 is used for PUSCH transmission to TRP1. The first P0 set for PUSCH in the P0 set list for PUSCH for TRP2 is used for PUSCH transmission to TRP2.

{Aspect 4-2-2}

One set (list, P0-PUSCH-SetList-r16) of P0 set for PUSCHs for Rel. 16 (P0-PUSCH-Set-r16) is configured. From the list, two P0 sets for PUSCH for Rel. 16 are determined for two respective TRPs, based on a rule. For example, the UE uses the first P0 set for PUSCH for Rel. 16 (with the lowest ID) for PUSCH transmission to the first TRP while using the second P0 set for PUSCH for Rel. 16 (with the second lowest ID) for PUSCH transmission to the second TRP.

FIG. 6B is a diagram to show an example of a configuration of P0s for PUSCH according to aspect 4-2-2.

In this example, one P0 set list for PUSCH (p0-PUSCH-SetList) is configured. This P0 set list for PUSCH includes P0 set for PUSCH with ID=0, P0 set for PUSCH with ID=1, P0 set for PUSCH with ID=2, and P0 set for PUSCH with ID=3. The first P0 set for PUSCH in the P0 set list for PUSCH is used for PUSCH transmission to TRP1. The second P0 set for PUSCH in the P0 set list for PUSCH is used for PUSCH transmission to TRP2.

{Aspect 4-2-3}

One set (list, P0-PUSCH-SetList-r16) of P0 set for PUSCHs for Rel. 16 (P0-PUSCH-Set-r16) is configured. In the list, two subsets of P0 set for PUSCHs for Rel. 16 are explicitly/implicitly configured for two respective TRPs. For example, first K P0 sets for PUSCH for Rel. 16 (first subset) are configured for the first TRP, while the (K+1)-th to the largest-numbered P0 sets for PUSCH for Rel. 16 (second subset) are configured for the second TRP. The UE uses the first P0 set for PUSCH for Rel. 16 (with the lowest ID) in the corresponding subset, for PUSCH transmission to each TRP.

K may be configured, may be defined in a specification, or may depend on UE capability.

FIG. 6C is a diagram to show an example of a configuration of P0s for PUSCH according to aspect 4-2-3.

In this example, one P0 set list for PUSCH (p0-PUSCH-SetList) is configured. This P0 set list for PUSCH includes a subset for TRP1 (Sub-set-TRP1) and a subset for TRP2 (Sub-set-TRP2). The subset for TRP1 includes a P0 set for PUSCH with ID=0 and a P0 set for PUSCH with ID=1. The subset for TRP2 includes a P0 set for PUSCH with ID=2 and a P0 set for PUSCH with ID=3. The first P0 set for PUSCH in the subset for TRP1 is used for PUSCH transmission to TRP1. The first P0 set for PUSCH in the subset for TRP2 is used for PUSCH transmission to TRP2.

{Aspect 4-2-4}

Two P0 set for PUSCHs for Rel. 16 (P0-PUSCH-Set-r16) used for a multi-TRP case are explicitly configured for two respective TRPs. The UE uses a corresponding (configured) P0 set for PUSCH for Rel. 16 for PUSCH transmission to each TRP.

To which one of TRP1 (first TRP) and TRP2 (second TRP) the UE transmits a PUSCH may be according to the fifth embodiment.

<<Aspect 4-3>> PLRS for PUSCH

If PUSCH transmission is scheduled by DCI format 0_0 and the UE is not provided with spatial setting for PUCCH transmission, or if PUSCH transmission is scheduled by DCI format 0_0 not including an SRI field, or if an SRI-PUSCH power control information element (SRI-PUSCH-PowerControl) is not provided to the UE (similar condition to that in case 3 above), the UE may follow any of aspects 4-3-1 to 4-3-4 below for a PLRS for PUSCH.

{Aspect 4-3-1}

Two sets of PLRSs for PUSCH are configured for two respective TRPs. The UE uses a PLRS with the lowest ID (for example, 0) in the corresponding set, for PUSCH transmission to each TRP.

FIG. 7A is a diagram to show an example of a configuration of PLRSs for PUSCH according to aspect 4-3-1.

In this example, a PLRS set for TRP1 (pathlossRS-TRP1) and a P0 set for TRP2 (pathlossRS-TRP2) are configured. The PLRS set for TRP1 includes a PLRS for PUSCH with ID (PUSCH-PLRS-ID)=0 and a PLRS for PUSCH with ID=1. The PLRS set for TRP2 includes a PLRS for PUSCH with ID=2 and a PLRS for PUSCH with ID=3. In the PLRS set for TRP1, the PLRS for PUSCH with the lowest ID (0) is used for PUSCH transmission to TRP1. In the PLRS set for TRP2, the PLRS for PUSCH with the lowest ID (2) is used for PUSCH transmission to TRP2.

{Aspect 4-3-2}

One set of PLRSs for PUSCH is configured. From the set, two values of PLRSs for PUSCH for two respective TRPs are determined based on a rule. For example, the UE uses the PLRS for PUSCH with the lowest ID (for example, 0) for PUSCH transmission to the first TRP while using the PLRS for PUSCH with the second lowest ID (for example, 1) for PUSCH transmission to the second TRP.

FIG. 7B is a diagram to show an example of a configuration of PLRSs for PUSCH according to aspect 4-3-2.

In this example, one set of PLRSs for PUSCH (pattlossRS) is configured. This set includes a PLRS for PUSCH with ID=0, a PLRS for PUSCH with ID=1, a PLRS for PUSCH with ID=2, and a PLRS for PUSCH with ID=3. In the set, the PLRS for PUSCH with the lowest ID (0) is used for PUSCH transmission to TRP1. In the set, the PLRS for PUSCH with the second lowest ID (1) is used for PUSCH transmission to TRP2.

{Aspect 4-3-3}

One set of PLRSs for PUSCH is configured. In the set, two subsets of PLRSs for PUSCH are explicitly/implicitly configured for two respective TRPs. For example, first K PLRSs for PUSCH (first subset) are configured for the first TRP, while the (K+1)-th to the largest-numbered PLRSs for PUSCH (second subset) are configured for the second TRP. The UE uses the PLRS for PUSCH with the lowest ID in the corresponding subset, for PUSCH transmission to each TRP.

K may be configured, may be defined in a specification, or may depend on UE capability.

FIG. 7C is a diagram to show an example of a configuration of PLRSs for PUSCH according to aspect 4-3-3.

In this example, one set of PLRSs for PUSCH (pathlossRS) is configured. This set includes a subset for TRP1 (Sub-set-TRP1) and a subset for TRP2 (Sub-set-TRP2). The subset for TRP1 includes a PLRS for PUSCH with ID=0 and a PLRS for PUSCH with ID=1. The subset for TRP2 includes a PLRS for PUSCH with ID=2 and a PLRS for PUSCH with ID=3. In the subset for TRP1, the PLRS for PUSCH with the lowest ID (0) is used for PUSCH transmission to TRP1. In the subset for TRP2, the PLRS for PUSCH with the lowest ID (2, K) is used for PUSCH transmission to TRP2.

{Aspect 4-3-4}

Two PLRSs for PUSCH used for a multi-TRP case are explicitly configured for two respective TRPs. The UE uses a corresponding (configured) PLRS for PUSCH, for PUSCH transmission to each TRP.

To which one of TRP1 (first TRP) and TRP2 (second TRP) the UE transmits a PUSCH may be according to the fifth embodiment.

<<Aspect 4-4>> Closed Loop Index for PUSCH

If PUSCH transmission is scheduled by a DCI format not including an SRI field, or if an SRI-PUSCH power control information element (SRI-PUSCH-PowerControl) is not provided to the UE, the UE may follow any of aspects 4-4-1 to 4-4-3 below for the closed loop index 1 for PUSCH.

{Aspect 4-4-1}

If PUSCH transmission is scheduled by a DCI format not including an SRI field or if an SRI-PUSCH power control information element (SRI-PUSCH-PowerControl) is not provided to the UE, the UE may use l=0 for PUSCH transmission to the first TRP while using l=1 for PUSCH transmission to the second TRP.

{Aspect 4-4-2}

Candidate values for the closed loop index for the multi-TRP case may be enhanced to l={0_0, 0_1, 1_0, 1_1}. Here, {0_0, 0_1} may be candidate values for the first TRP. {1_0, 1_1} may be candidate values for the second TRP. If PUSCH transmission is scheduled by a DCI format not including an SRI field or if an SRI-PUSCH power control information element (SRI-PUSCH-PowerControl) is not provided to the UE, the UE may use l=0_0 for PUSCH transmission to the first TRP while using l=1_0 for PUSCH transmission to the second TRP.

{Aspect 4-4-3}

A closed loop power control adjustment state $f_{b,f,c}(i,l)$ may be enhanced to $f_{b,f,c}(i,l,x)$. A TPC command value $\delta_{PUSCH,b,f,c}(m,l)$ may be enhanced to $\delta_{PUSCH,b,f,c}(m,l,x)$. Here, x may denote a TRP index. If PUSCH transmission is scheduled by a DCI format not including an SRI field or if an SRI-PUSCH power control information element (SRI-PUSCH-PowerControl) is not provided to the UE, the UE may use l=0 and x=0 for PUSCH transmission to the first TRP while using l=0 and x=1 for PUSCH transmission to the second TRP.

According to this embodiment, the UE can use an appropriate power control parameter for PUSCH transmission to a particular TRP.

Fifth Embodiment

A description will be given of a method for the UE to determine to which TRP the UE transmits a PUSCH.

The UE may use, for PUSCH transmission to one TRP based on a fifth embodiment, at least one of P0 for PUSCH, alpha, a PUSCH pathloss reference RS, and a closed loop index for the TRP determined based on the fourth embodiment.

<<Aspect 5-1>> PUSCH Transmission without Repetition

For PUSCH transmission without repetition, the UE may determine association between the PUSCH transmission and a TRP according to any one of aspects 5-1-1 to 5-1-3 below.

{Aspect 5-1-1}

The association is determined based on the CORESET pool index of a CORESET for the UE to detect UL scheduling DCI. The UL scheduling DCI may be, for example, DCI format 0_0/0_1/0_2.

This aspect may be applied only to multi-TRP based on multi-DCI.

{Aspect 5-1-2}

A TRP index/CORESET pool index is explicitly configured by UL scheduling DCI. The UL scheduling DCI may be, for example, DCI format 0_0/0_1/0_2.

{Aspect 5-1-3}

The TRP index/CORESET pool index is semi-statically configured by RRC/activated by a MAC CE and is used until RRC reconfiguration or reception of a new MAC CE.

Either of aspects 5-1-2 and 5-1-3 may be used for both multi-TRP based on single DCI and multi-TRP based on multi-DCI.

For the TRP index/CORESET pool index=0, the UE may use P0/alpha/PLRS/closed loop index for the first TRP in the fourth embodiment. For the TRP index/CORESET pool index=1, the UE may use P0/alpha/PLRS/closed loop index for the second TRP in the fourth embodiment.

<<Aspect 5-2>> PUSCH Repetition

For PUSCH repetition, whether a plurality of repetitions are associated with single TRP or multi-TRP may be according to aspects 5-2-1 and 5-2-2 below.

{Aspect 5-2-1}

Whether a plurality of repetitions are associated with a single TRP or multi-TRP is explicitly configured in UL scheduling DCI.

{Aspect 5-2-2}

Whether a plurality of repetitions are associated with a single TRP or multi-TRP is configured by RRC/activated by a MAC CE and is used until RRC reconfiguration or reception of a new MAC CE.

Either of aspects 5-2-1 and 5-2-2 may be used for both multi-TRP based on single DCI and multi-TRP based on multi-DCI.

Based on either of aspects 5-2-1 and 5-2-2, when all the plurality of PUSCH repetitions are associated with a single TRP, with which TRP all the plurality of PUSCH repetitions are associated may be determined by using a method similar to that in aspect 5-1.

Figures 8A, 8B, 8C:
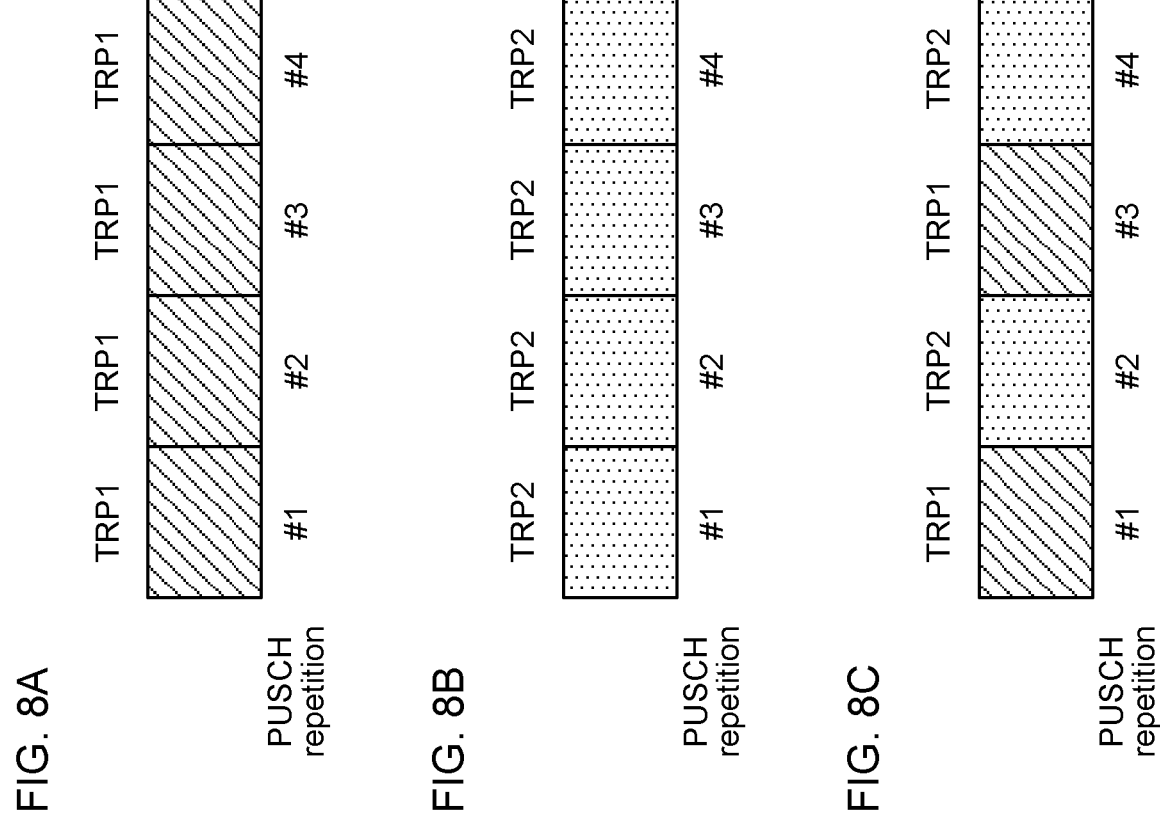
FIGS. 8A to 8C are diagrams to show examples of association between PUCCH repetition and TRPs according to aspect 5-2.

In the example in FIG. 8A, PUSCH repetitions #1 to #4 are associated with TRP1 (single TRP). In the example in FIG. 8B, PUSCH repetitions #1 to #4 are associated with TRP2 (single TRP). In the example in FIG. 8C, PUSCH repetitions #1 and #3 are associated with TRP1, while PUSCH repetitions #2 and #4 are associated with TRP2. TRP1 and TRP2 (multi-TRP) may be associated with PUSCH repetitions by cyclic mapping to be described below.

If the plurality of PUSCH repetitions are associated with multi-TRP, mapping between PUSCH repetitions and TRPs may follow mappings 1 to 3 below.

{Mapping 1} Cyclic Mapping

Cyclic mapping pattern: first and second beams (TRPs) are used for first and second PUSCH repetitions, respectively. The same beam mapping pattern is continuously applied to remaining PUSCH repetitions.

FIG. 9A shows an example of mapping 1. In this example, the number of PUSCH repetitions is four. PUSCH repetitions #1 and #3 are associated with TRP1, while PUSCH repetitions #2 and #4 are associated with TRP2.

{Mapping 2} Sequential Mapping

Sequential mapping pattern: a first beam (TRP) is used for first and second PUSCH repetitions. The second beam is used for third and fourth PUSCH repetitions. The same beam mapping pattern is continuously applied to remaining PUSCH repetitions.

FIG. 9B shows an example of mapping 2. In this example, the number of PUSCH repetitions is eight. PUSCH repetitions #1 and #2 are associated with TRP1, while PUSCH repetitions #3 and #4 are associated with TRP2. This mapping pattern is repeated for PUSCH repetitions #5 to #8.

{Mapping 3} Half-Half Mapping

Among a plurality of PUSCH repetitions, PUSCH repetitions in the first half are mapped to the first TRP (beam). Among the plurality of PUSCH repetitions, PUSCH repetitions in the second half are mapped to the second TRP.

FIG. 9C shows an example of mapping 3. In this example, the number of PUSCH repetitions is eight. PUSCH repetitions #1 to #4 are associated with TRP1, while PUSCH repetitions #5 to #8 are associated with TRP2.

One or a plurality of these mapping patterns may be supported, and one of the mapping patterns may be configured by RRC.

According to this embodiment, the UE can perform PUSCH transmission to an appropriate TRP (by using an appropriate beam).

Sixth Embodiment

UE capability corresponding to at least one function (characteristics, feature) in the fourth and fifth embodiments may be defined. When the UE reports this UE capability, the UE may perform the corresponding function. When the UE reports this UE capability and a higher layer parameter corresponding to this function is configured, the UE may perform the corresponding function. The higher layer parameter (RRC information element) corresponding to this function may be defined. When this higher layer parameter is configured, the UE may perform the corresponding function.

The UE capability may indicate whether the UE supports this function.

The UE capability may be that, when a PUSCH is scheduled by DCI format without an SRI field or when the UE is not provided with an SRI-PUSCH power control information element (SRI-PUSCH-PowerControl), the UE supports different P0/alpha/P0 set for PUSCH for Rel. 16 (P0-PUSCH-Set-r16)/PLRS/closed loop index for PUSCH transmission to each of a plurality of different TRPs, for PUSCH transmission without repetition.

The UE capability may be that, when a PUSCH is scheduled by DCI format without an SRI field or when the UE is not provided with an SRI-PUSCH power control information element (SRI-PUSCH-PowerControl), the UE supports different P0/alpha/P0 set for PUSCH for Rel. 16 (P0-PUSCH-Set-r16)/PLRS/closed loop index for PUSCH repetitions of each of different PUSCHs to a plurality of different TRPs, for PUSCH repetition. For PUSCH repetitions of the same PUSCH, the UE may use the same power control parameter. For example, the UE may support the example in FIG. 8A and the example in FIG. 8B and need not necessarily support the example in FIG. 8C.

The UE capability may be that, when a PUSCH is scheduled by DCI format without an SRI field or when the UE is not provided with an SRI-PUSCH power control information element (SRI-PUSCH-PowerControl), the UE supports different P0/alpha/P0 set for PUSCH for Rel. 16 (P0-PUSCH-Set-r16)/PLRS/closed loop index for PUSCH repetitions of the same PUSCH to a plurality of different TRPs, for PUSCH repetition. For example, the UE may support the example in FIG. 8C.

The UE capability may be that, when a PUSCH is scheduled by DCI format without an SRI field or when the UE is not provided with an SRI-PUSCH power control information element (SRI-PUSCH-PowerControl), the UE supports different P0/alpha/P0 set for PUSCH for Rel. 16 (P0-PUSCH-Set-r16)/PLRS/closed loop index for each of a plurality of different TRPs in at least one of a case of multi-TRP based on single DCI and a case of multi-TRP based on multi-DCI.

According to this embodiment, the UE can implement the above functions while maintaining compatibility with an existing specification.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 10:
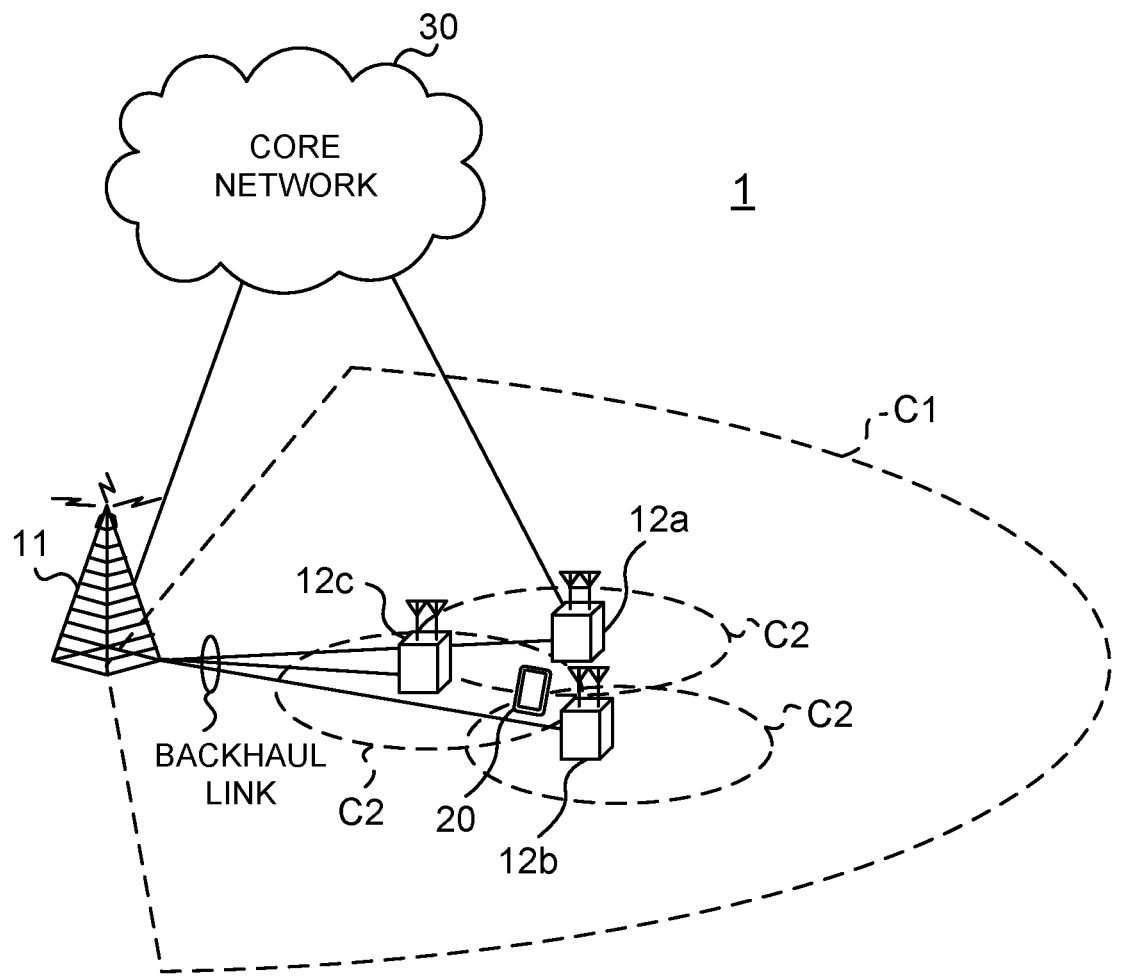
FIG. 10 is a diagram to show an example of a schematic structure of a radio communication system according to one embodiment.

FIG. 10 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 11:
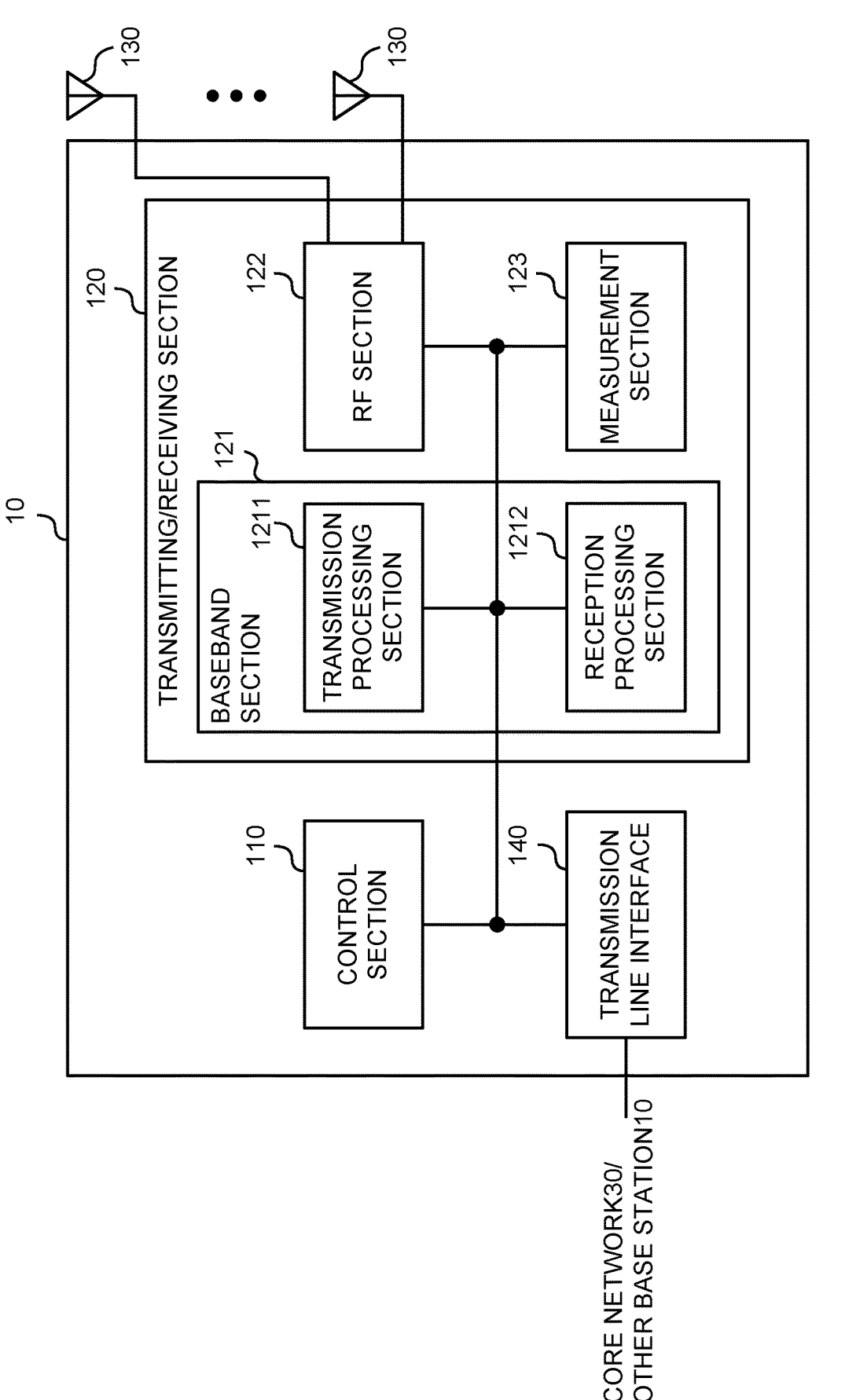
FIG. 11 is a diagram to show an example of a structure of a base station according to one embodiment.

FIG. 11 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

When a physical uplink control channel (PUCCH) spatial relation information is not provided to a terminal, the control section 110 may determine two values of a power control parameter. The transmitting/receiving section 120 may receive a PUCCH transmitted by using at least one of the two values of the power control parameter and one or more transmission occasions. The two values may be associated with two respective indices. The two indices may be either two index values of a control resource set (CORESET) pool index or two index values of a transmission configuration indication (TCI) state associated with one codepoint of a field in downlink control information.

When a physical uplink shared channel (PUSCH) is scheduled by downlink control information not including a sounding reference signal resource indicator (SRI) field or when an SRI-PUSCH power control information element is not provided to a terminal, the control section 110 may determine two values of a power control parameter. The transmitting/receiving section 120 may receive a PUSCH transmitted by using at least one of the two values of the power control parameter and one or more transmission occasions. The two values may be associated with two respective indices. The two indices may be either two index values of a control resource set (CORESET) pool index or two index values of a transmission configuration indication (TCI) state associated with one codepoint of a field in downlink control information.

(User Terminal)

Figure 12:
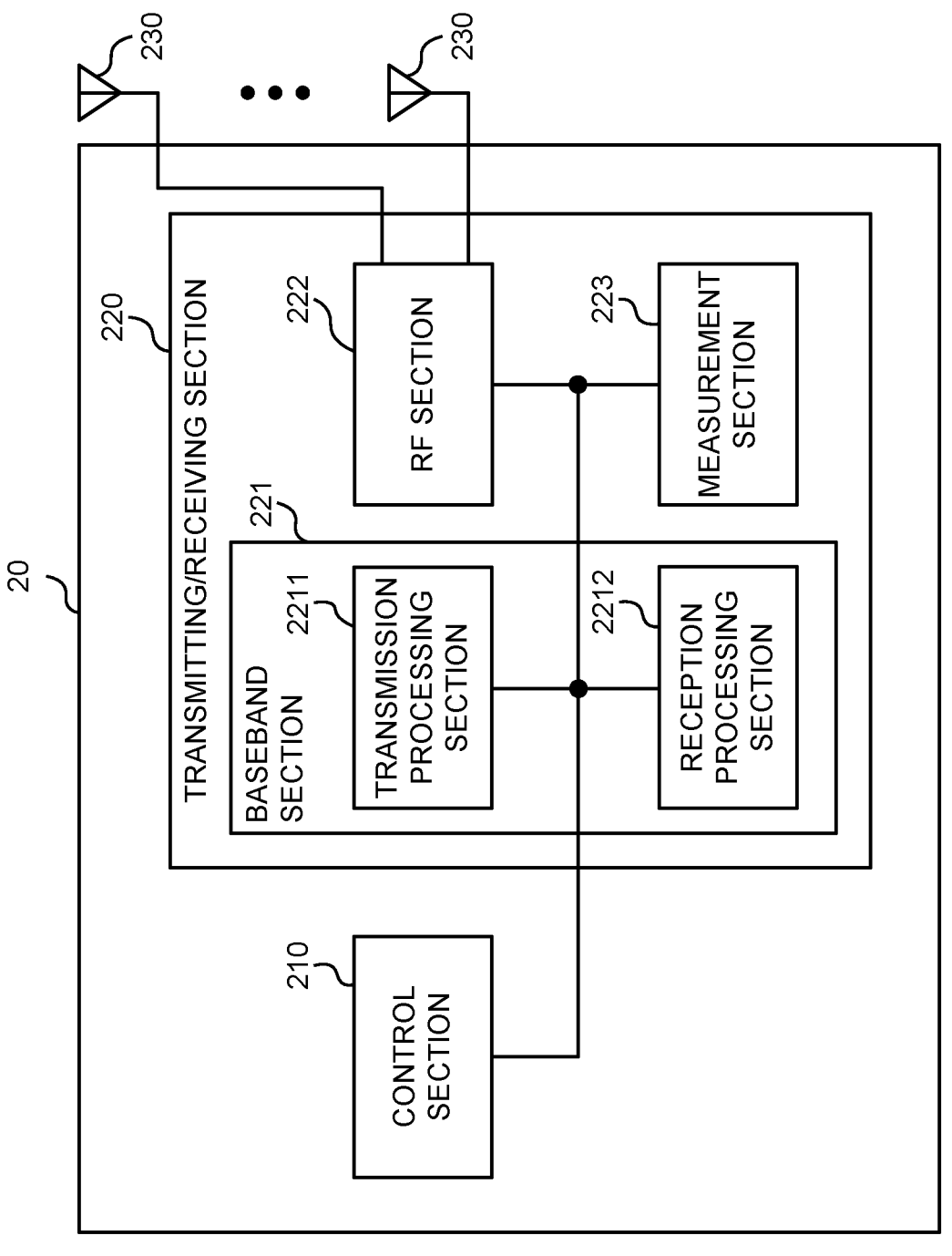
FIG. 12 is a diagram to show an example of a structure of a user terminal according to one embodiment.

FIG. 12 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

When a physical uplink control channel (PUCCH) spatial relation information is not provided, the control section 210 may determine two values of a power control parameter. The transmitting/receiving section 220 may transmit a PUCCH by using at least one of the two values of the power control parameter and one or more transmission occasions. The two values may be associated with two respective indices. The two indices may be either two index values of a control resource set (CORESET) pool index or two index values of a transmission configuration indication (TCI) state associated with one codepoint of a field in downlink control information (first to third embodiments).

The control section 210 may determine the two values from any of two sets of the power control parameter, one set of the power control parameter, and two subsets of one set of the power control parameter (first embodiment).

The control section 210 may associate at least one of the two values with the one or more transmission occasions, based on at least one of downlink control information indicating a resource of the PUCCH, the resource of the PUCCH, a radio resource control information element, and a medium access control (MAC) control element (CE) (second embodiment).

The power control parameter may be at least one of P0, a pathloss reference signal, and a closed loop index (first embodiment).

When a physical uplink shared channel (PUSCH) is scheduled by downlink control information not including a sounding reference signal resource indicator (SRI) field or when an SRI-PUSCH power control information element is not provided, the control section 210 may determine two values of a power control parameter. The transmitting/receiving section 220 may transmit a PUSCH by using at least one of the two values of the power control parameter and one or more transmission occasions. The two values may be associated with two respective indices. The two indices may be either two index values of a control resource set (CORESET) pool index or two index values of a transmission configuration indication (TCI) state associated with one codepoint of a field in downlink control information (fourth to sixth embodiments).

The control section 210 may determine the two values from any of two sets of the power control parameter, one set of the power control parameter, and two subsets of one set of the power control parameter (fourth embodiment).

The control section 210 may associate at least one of the two values with the one or more transmission occasions, based on at least one of downlink control information for scheduling the PUSCH, a radio resource control information element, and a medium access control (MAC) control element (CE) (fifth embodiment).

The power control parameter may be at least one of P0, alpha, a pathloss reference signal, and a closed loop index (fourth embodiment).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 13:
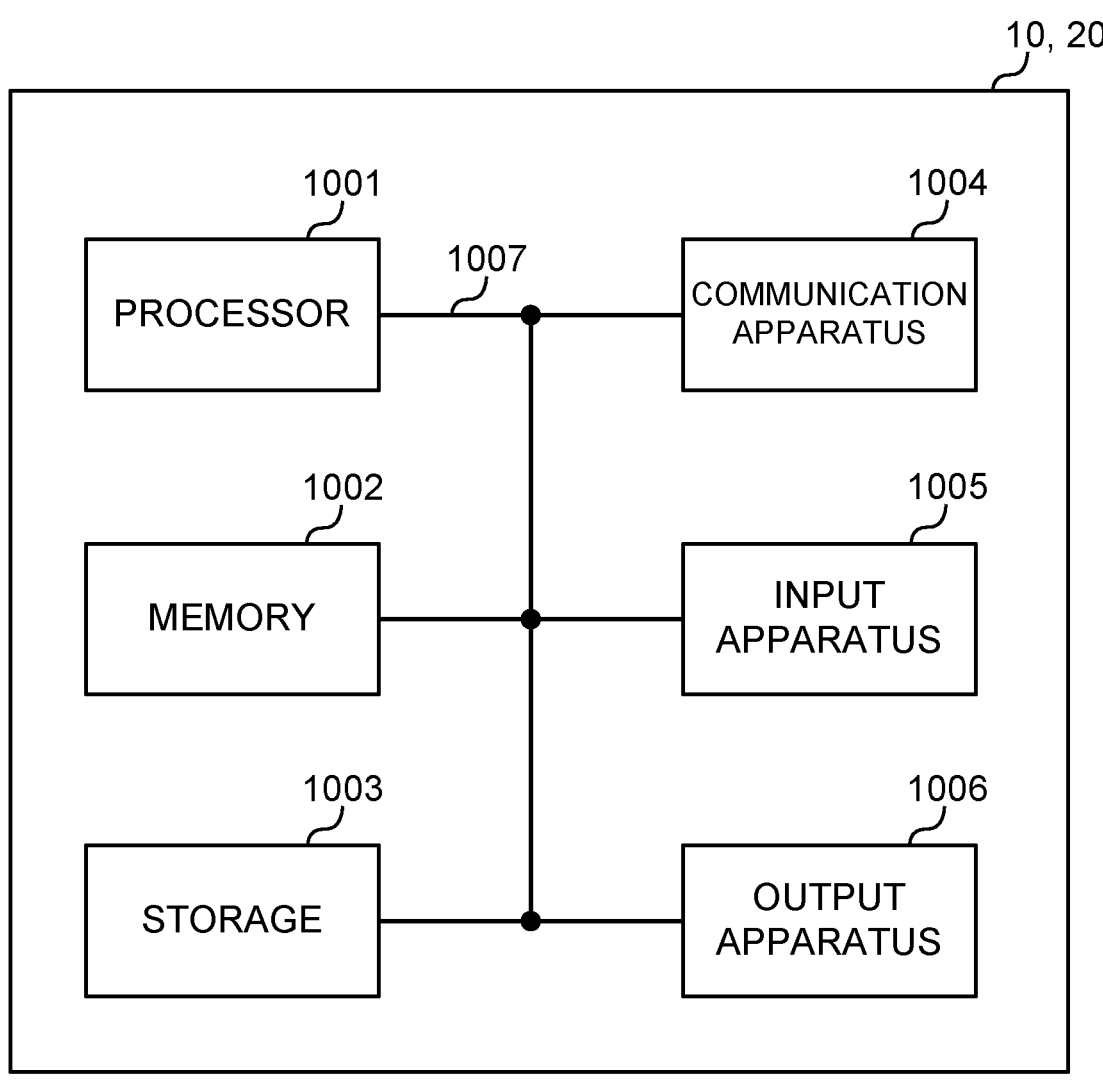
FIG. 13 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 13 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAN), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table.

The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" and so on may be interpreted as the words corresponding to the terminal-to-terminal communication (for example, "sidelink"). For example, an uplink channel, a downlink channel, and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
a processor that, when physical uplink control channel (PUCCH) spatial relation information is not provided, determines values of a first power control parameter and a second power control parameter, the first power control parameter and the second power control parameter being applied to PUCCH repetitions for multiple transmission/reception points (TRPs); and a transmitter that performs the PUCCH repetitions using the values of the first power control parameter and the second power control parameter and one or more transmission occasions, wherein whether the PUCCH repetitions using a certain PUCCH resource are associated with a first TRP, a second TRP, or both the first TRP and the second TRP, of the multiple TRPs is configured for each PUCCH resource including the certain PUCCH resource, and wherein the transmitter reports a UE capability indicating support of the first power control parameter and the second power control parameter, the first power control parameter and the second power control parameter being applied to the PUCCH repetitions.

2. The terminal according to claim 1, wherein each of the first power control parameter and the second power control parameter is at least one of P0 for PUCCH, a PUCCH pathloss reference signal and a closed loop index.

3. The terminal according to claim 1, wherein the processor applies cyclic mapping or sequential mapping to mapping of the PUCCH repetitions and the values of the first power control parameter and the second power control parameter.

4. The terminal according to claim 1, wherein when a number of the PUCCH repetitions is 4 and a number of the multiple TRPs is 2, the processor employs mapping of applying a value of the first power control parameter to first and third PUCCH repetitions for the first TRP and applying a value of the second power control parameter to second and fourth PUCCH repetitions for the second TRP, or mapping of applying the value of the first power control parameter to the first and second PUCCH repetitions for the first TRP and applying the value of the second power control parameter to the third and fourth PUCCH repetitions for the second TRP.

5. A radio communication method for a terminal, comprising:

when physical uplink control channel (PUCCH) spatial relation information is not provided, determining values of a first power control parameter and a second power control parameter, the first power control parameter and the second power control parameter being applied to PUCCH repetitions for multiple transmission/reception points (TRPs); and performing the PUCCH repetitions using the values of the first power control parameter and the second power control parameter and one or more transmission occasions, wherein whether the PUCCH repetitions using a certain PUCCH resource are associated with a first TRP, a second TRP, or both the first TRP and the second TRP, of the multiple TRPs is configured for each PUCCH resource including the certain PUCCH resource, and wherein the terminal reports a UE capability indicating support of the first power control parameter and the second power control parameter, the first power control parameter and the second power control parameter being applied to the PUCCH repetitions.

6. A base station comprising:

a processor that, when physical uplink control channel (PUCCH) spatial relation information is not provided to a terminal, determines values of a first power control parameter and a second power control parameter, the first power control parameter and the second power control parameter being applied to PUCCH repetitions for multiple transmission/reception points (TRPs); and a receiver that receives the PUCCH repetitions that are performed using the values of the first power control parameter and the second power control parameter and one or more transmission occasions, wherein whether the PUCCH repetitions using a certain PUCCH resource are associated with a first TRP, a second TRP, or both the first TRP and the second TRP, of the multiple TRPs is configured for each PUCCH resource including the certain PUCCH resource, and wherein the receiver receives, from the terminal, a UE capability indicating support of the first power control parameter and the second power control parameter, the first power control parameter and the second power control parameter being applied to the PUCCH repetitions.

7. A system comprising: a terminal; and a base station, wherein the terminal comprises:

a processor that, when physical uplink control channel (PUCCH) spatial relation information is not provided, determines values of a first power control parameter and a second power control parameter, the first power control parameter and the second power control parameter being applied to PUCCH repetitions for multiple transmission/reception points (TRPs); and a transmitter that performs the PUCCH repetitions using the values of the first power control parameter and the second power control parameter and one or more transmission occasions, wherein the transmitter reports a UE capability indicating support of the first power control parameter and the second power control parameter, the first power control parameter and the second power control parameter being applied to the PUCCH repetitions, and the base station comprises:

a processor that, when the PUCCH spatial relation information is not provided to the terminal, determines the values of the first power control parameter and the second power control parameter; and a receiver that receives the PUCCH repetitions that are performed using the values of the first power control parameter and the second power control parameter and the one or more transmission occasions, wherein the receiver receives, from the terminal, the UE capability, and wherein whether the PUCCH repetitions using a certain PUCCH resource are associated with a first TRP, a second TRP, or both the first TRP and the second TRP, of the multiple TRPs is configured for each PUCCH resource including the certain PUCCH resource.

* * * * *